United States Patent
Welch et al.

(10) Patent No.: US 12,440,301 B2
(45) Date of Patent: Oct. 14, 2025

(54) SYSTEM FOR DELIVERY OF A FIDUCIAL MARKER

(71) Applicant: Teleflex Life Sciences LLC, Wilmington, DE (US)

(72) Inventors: Jacqueline Nerney Welch, Moraga, CA (US); Floria Cheng, San Francisco, CA (US); Jolene Cutts, San Francisco, CA (US); Alexander Charles Gordon, San Carlos, CA (US); Kevin Alexander Lessard, San Francisco, CA (US); Curtis Yarra, Oakland, CA (US); Christopher Zaler, Los Gatos, CA (US); Joseph Catanese, III, San Leandro, CA (US)

(73) Assignee: Teleflex Life Sciences LLC, Wilmington, DE (US)

( * ) Notice: Subject to any disclaimer, the term of this patent is extended or adjusted under 35 U.S.C. 154(b) by 681 days.

(21) Appl. No.: 17/283,497

(22) PCT Filed: Oct. 30, 2019

(86) PCT No.: PCT/US2019/058708
§ 371 (c)(1),
(2) Date: Apr. 7, 2021

(87) PCT Pub. No.: WO2020/096827
PCT Pub. Date: May 14, 2020

(65) Prior Publication Data
US 2021/0378784 A1 Dec. 9, 2021

(51) Int. Cl.
*A61B 90/00* (2016.01)
*A61B 17/00* (2006.01)
*A61B 17/04* (2006.01)

(52) U.S. Cl.
CPC ........ *A61B 90/39* (2016.02); *A61B 17/00234* (2013.01); *A61B 2017/00004* (2013.01);
(Continued)

(58) Field of Classification Search
CPC .............. A61B 90/39; A61B 17/00234; A61B 2017/00004; A61B 2017/00274;
(Continued)

(56) References Cited

U.S. PATENT DOCUMENTS

| 659,422 A | 10/1900 | Shidler |
| 780,392 A | 1/1905 | Wanamaker et al. |

(Continued)

FOREIGN PATENT DOCUMENTS

| CA | 2477220 | 11/2007 |
| CN | 1697633 A | 11/2005 |

(Continued)

OTHER PUBLICATIONS

European Extended Search Report and Search Opinion mailed Jun. 16, 2023, in EP Application No. 23169061.1.
(Continued)

*Primary Examiner* — Sean D Mattson
(74) *Attorney, Agent, or Firm* — Dorsey & Whitney LLP

(57) ABSTRACT

A transurethral system for delivering and depositing fiducial markers usable to delineate the prostate during radiation therapy includes at least one implant or anchor assembly featuring a first anchoring component, a second anchoring component, and a connector. A delivery device featuring a handle assembly, an actuator, and an elongate member delivers the implant or anchor assembly to an interventional site.

19 Claims, 10 Drawing Sheets

(52) U.S. Cl.
CPC ............... *A61B 2017/00274* (2013.01); *A61B 2017/0419* (2013.01); *A61B 2017/0464* (2013.01); *A61B 2090/3908* (2016.02); *A61B 2090/3966* (2016.02); *A61B 2090/3987* (2016.02)

(58) Field of Classification Search
CPC .... A61B 2017/0419; A61B 2017/0464; A61B 2090/3908; A61B 2090/3966; A61B 2090/3987
See application file for complete search history.

(56) References Cited

U.S. PATENT DOCUMENTS

| | | | |
|---|---|---|---|
| 789,467 | A | 5/1905 | West |
| 2,360,164 | A | 10/1944 | Frank |
| 2,485,531 | A | 10/1949 | William et al. |
| 2,579,192 | A | 12/1951 | Alexander |
| 2,646,298 | A | 7/1953 | Leary |
| 2,697,624 | A | 12/1954 | Thomas et al. |
| 2,734,299 | A | 2/1956 | Masson |
| 2,825,592 | A | 3/1958 | Mckenzie |
| 3,326,586 | A | 6/1967 | Frost et al. |
| 3,470,834 | A | 10/1969 | Bone |
| 3,521,918 | A | 7/1970 | Hammond |
| 3,541,591 | A | 11/1970 | Hoegerman |
| 3,664,345 | A | 5/1972 | Dabbs et al. |
| 3,713,680 | A | 1/1973 | Pagano |
| 3,716,058 | A | 2/1973 | Tanner |
| 3,756,638 | A | 9/1973 | Stockberger |
| 3,873,140 | A | 3/1975 | Bloch |
| 3,875,648 | A | 4/1975 | Bone |
| 3,886,933 | A | 6/1975 | Mori et al. |
| 3,931,667 | A | 1/1976 | Merser et al. |
| 3,976,079 | A | 8/1976 | Samuels et al. |
| 4,006,747 | A | 2/1977 | Kronenthal et al. |
| 4,137,920 | A | 2/1979 | Bonnet |
| 4,164,225 | A | 8/1979 | Johnson et al. |
| 4,210,148 | A | 7/1980 | Stivala |
| 4,235,238 | A | 11/1980 | Ogiu et al. |
| 4,291,698 | A | 9/1981 | Fuchs et al. |
| 4,409,974 | A | 10/1983 | Freedland |
| 4,419,094 | A | 12/1983 | Patel |
| 4,452,236 | A | 6/1984 | Utsugi |
| 4,493,323 | A | 1/1985 | Albright et al. |
| 4,513,746 | A | 4/1985 | Aranyi et al. |
| 4,621,640 | A | 11/1986 | Mulhollan et al. |
| 4,655,771 | A | 4/1987 | Wallsten |
| 4,657,461 | A | 4/1987 | Smith |
| 4,669,473 | A | 6/1987 | Richards et al. |
| 4,705,040 | A | 11/1987 | Mueller et al. |
| 4,714,281 | A | 12/1987 | Peck |
| 4,738,255 | A | 4/1988 | Goble et al. |
| 4,741,330 | A | 5/1988 | Hayhurst |
| 4,744,364 | A | 5/1988 | Kensey |
| 4,750,492 | A | 6/1988 | Jacobs |
| 4,762,128 | A | 8/1988 | Rosenbluth |
| 4,790,809 | A | 12/1988 | Kuntz |
| 4,823,794 | A | 4/1989 | Pierce |
| 4,863,439 | A | 9/1989 | Sanderson |
| 4,893,623 | A | 1/1990 | Rosenbluth |
| 4,899,743 | A | 2/1990 | Nicholson et al. |
| 4,926,860 | A | 5/1990 | Stice et al. |
| 4,935,028 | A | 6/1990 | Drews |
| 4,946,468 | A | 8/1990 | Li |
| 4,955,859 | A | 9/1990 | Zilber |
| 4,955,913 | A | 9/1990 | Robinson |
| 4,968,315 | A | 11/1990 | Gatturna |
| 4,994,066 | A | 2/1991 | Voss |
| 5,002,550 | A | 3/1991 | Li |
| 5,019,032 | A | 5/1991 | Robertson |
| 5,041,129 | A | 8/1991 | Hayhurst et al. |
| 5,046,513 | A | 9/1991 | Gatturna et al. |
| 5,053,046 | A | 10/1991 | Janese |
| 5,078,731 | A | 1/1992 | Hayhurst |
| 5,080,660 | A | 1/1992 | Buelna |
| 5,098,374 | A | 3/1992 | Othel-Jacobsen et al. |
| 5,100,421 | A | 3/1992 | Christoudias |
| 5,123,914 | A | 6/1992 | Cope |
| 5,127,393 | A | 7/1992 | McFarlin et al. |
| 5,129,912 | A | 7/1992 | Noda et al. |
| 5,133,713 | A | 7/1992 | Huang et al. |
| 5,159,925 | A | 11/1992 | Neuwirth et al. |
| 5,160,339 | A | 11/1992 | Chen et al. |
| 5,163,960 | A | 11/1992 | Bonutti |
| 5,167,614 | A | 12/1992 | Tessmann et al. |
| 5,192,303 | A | 3/1993 | Gatturna et al. |
| 5,203,787 | A | 4/1993 | Noblitt et al. |
| 5,207,672 | A | 5/1993 | Roth et al. |
| 5,217,470 | A | 6/1993 | Weston |
| 5,217,486 | A | 6/1993 | Rice et al. |
| 5,234,454 | A | 8/1993 | Bangs |
| 5,236,445 | A | 8/1993 | Hayhurst et al. |
| 5,237,984 | A | 8/1993 | Williams et al. |
| 5,254,126 | A | 10/1993 | Filipi et al. |
| 5,258,015 | A | 11/1993 | Li et al. |
| 5,267,960 | A | 12/1993 | Hayman et al. |
| 5,269,802 | A | 12/1993 | Garber |
| 5,269,809 | A | 12/1993 | Hayhurst et al. |
| 5,300,099 | A | 4/1994 | Rudie |
| 5,306,280 | A | 4/1994 | Bregen et al. |
| 5,322,501 | A | 6/1994 | Mahmud-Durrani |
| 5,330,488 | A | 7/1994 | Goldrath |
| 5,334,200 | A | 8/1994 | Johnson |
| 5,336,240 | A | 8/1994 | Metzler et al. |
| 5,350,399 | A | 9/1994 | Erlebacher et al. |
| 5,354,271 | A | 10/1994 | Voda |
| 5,358,511 | A | 10/1994 | Gatturna et al. |
| 5,364,408 | A | 11/1994 | Gordon |
| 5,366,490 | A | 11/1994 | Edwards et al. |
| 5,368,599 | A | 11/1994 | Hirsch et al. |
| 5,370,646 | A | 12/1994 | Reese et al. |
| 5,370,661 | A | 12/1994 | Branch |
| 5,372,600 | A | 12/1994 | Beyar et al. |
| 5,380,334 | A | 1/1995 | Torrie et al. |
| 5,391,182 | A | 2/1995 | Chin |
| 5,403,348 | A | 4/1995 | Bonutti |
| 5,405,352 | A | 4/1995 | Weston |
| 5,409,453 | A | 4/1995 | Lundquist et al. |
| 5,411,520 | A | 5/1995 | Nash et al. |
| 5,417,691 | A | 5/1995 | Hayhurst |
| 5,435,805 | A | 7/1995 | Edwards et al. |
| 5,441,485 | A | 8/1995 | Peters |
| 5,458,612 | A | 10/1995 | Chin |
| 5,464,416 | A | 11/1995 | Steckel |
| 5,470,308 | A | 11/1995 | Edwards et al. |
| 5,470,337 | A | 11/1995 | Moss |
| 5,472,446 | A | 12/1995 | Torre |
| 5,478,003 | A | 12/1995 | Green et al. |
| 5,480,406 | A | 1/1996 | Nolan et al. |
| 5,499,994 | A | 3/1996 | Tihon et al. |
| 5,501,690 | A | 3/1996 | Measamer et al. |
| 5,507,754 | A | 4/1996 | Green et al. |
| 5,522,846 | A | 6/1996 | Bonutti |
| 5,531,759 | A | 7/1996 | Kensey et al. |
| 5,531,763 | A | 7/1996 | Mastri et al. |
| 5,534,012 | A | 7/1996 | Bonutti |
| 5,536,240 | A | 7/1996 | Edwards et al. |
| 5,540,655 | A | 7/1996 | Edwards et al. |
| 5,540,701 | A | 7/1996 | Sharkey et al. |
| 5,540,704 | A | 7/1996 | Gordon et al. |
| 5,542,594 | A | 8/1996 | Mckean et al. |
| 5,545,171 | A | 8/1996 | Sharkey et al. |
| 5,545,178 | A | 8/1996 | Kensey et al. |
| 5,549,631 | A | 8/1996 | Bonutti |
| 5,550,172 | A | 8/1996 | Regula et al. |
| 5,554,162 | A | 9/1996 | DeLange |
| 5,554,171 | A | 9/1996 | Gatturna et al. |
| 5,562,688 | A | 10/1996 | Riza |
| 5,562,689 | A | 10/1996 | Green et al. |
| 5,569,305 | A | 10/1996 | Bonutti |
| 5,571,104 | A | 11/1996 | Li |
| 5,573,540 | A | 11/1996 | Yoon |

(56) References Cited

U.S. PATENT DOCUMENTS

| | | |
|---|---|---|
| 5,578,044 A | 11/1996 | Gordon et al. |
| 5,591,177 A | 1/1997 | Lehrer |
| 5,591,179 A | 1/1997 | Edelstein |
| 5,593,421 A | 1/1997 | Bauer |
| 5,611,515 A | 3/1997 | Benderev et al. |
| 5,620,461 A | 4/1997 | Moer et al. |
| 5,626,614 A | 5/1997 | Hart |
| 5,630,824 A | 5/1997 | Hart |
| 5,643,321 A | 7/1997 | McDevitt |
| 5,647,836 A | 7/1997 | Blake et al. |
| 5,653,373 A | 8/1997 | Green et al. |
| 5,665,109 A | 9/1997 | Yoon |
| 5,667,486 A | 9/1997 | Mikulich et al. |
| 5,667,488 A | 9/1997 | Lundquist et al. |
| 5,667,522 A | 9/1997 | Flomenblit et al. |
| 5,669,917 A | 9/1997 | Sauer et al. |
| 5,672,171 A | 9/1997 | Andrus et al. |
| 5,690,649 A | 11/1997 | Li |
| 5,690,677 A | 11/1997 | Schmieding et al. |
| 5,697,950 A | 12/1997 | Fucci et al. |
| 5,707,394 A | 1/1998 | Miller et al. |
| 5,716,368 A | 2/1998 | Torre et al. |
| 5,718,717 A | 2/1998 | Bonutti |
| 5,725,556 A | 3/1998 | Moser et al. |
| 5,725,557 A | 3/1998 | Gatturna et al. |
| 5,733,306 A | 3/1998 | Bonutti |
| 5,741,276 A | 4/1998 | Poloyko et al. |
| 5,746,753 A | 5/1998 | Sullivan et al. |
| 5,749,846 A | 5/1998 | Edwards et al. |
| 5,749,889 A | 5/1998 | Bacich et al. |
| 5,752,963 A | 5/1998 | Allard et al. |
| 5,775,328 A | 7/1998 | Lowe et al. |
| 5,782,862 A | 7/1998 | Bonutti |
| 5,782,864 A | 7/1998 | Lizardi |
| 5,791,022 A | 8/1998 | Bohman |
| 5,800,445 A | 9/1998 | Ratcliff et al. |
| 5,807,403 A | 9/1998 | Beyar et al. |
| 5,810,848 A | 9/1998 | Hayhurst |
| 5,810,853 A | 9/1998 | Yoon |
| 5,814,072 A | 9/1998 | Bonutti |
| 5,830,179 A | 11/1998 | Mikus et al. |
| 5,830,221 A | 11/1998 | Stein et al. |
| 5,845,645 A | 12/1998 | Bonutti |
| 5,846,254 A | 12/1998 | Schulze et al. |
| 5,861,002 A | 1/1999 | Desai |
| 5,868,762 A | 2/1999 | Cragg et al. |
| 5,873,891 A | 2/1999 | Sohn |
| 5,879,357 A | 3/1999 | Heaton et al. |
| 5,897,574 A | 4/1999 | Bonutti |
| 5,899,911 A | 5/1999 | Carter |
| 5,899,921 A | 5/1999 | Caspari et al. |
| 5,904,679 A | 5/1999 | Clayman |
| 5,904,696 A | 5/1999 | Rosenman |
| 5,908,428 A | 6/1999 | Scirica et al. |
| 5,908,447 A | 6/1999 | Schroeppel et al. |
| 5,919,198 A | 7/1999 | Graves et al. |
| 5,919,202 A | 7/1999 | Yoon |
| 5,921,982 A | 7/1999 | Lesh et al. |
| 5,921,986 A | 7/1999 | Bonutti |
| 5,928,252 A | 7/1999 | Steadman et al. |
| 5,931,844 A | 8/1999 | Thompson et al. |
| 5,941,439 A | 8/1999 | Kammerer et al. |
| 5,944,739 A | 8/1999 | Zlock et al. |
| 5,948,000 A | 9/1999 | Larsen et al. |
| 5,948,001 A | 9/1999 | Larsen |
| 5,948,002 A | 9/1999 | Bonutti |
| 5,954,057 A | 9/1999 | Li |
| 5,954,731 A | 9/1999 | Yoon |
| 5,954,747 A | 9/1999 | Clark |
| 5,964,732 A | 10/1999 | Willard |
| 5,971,447 A | 10/1999 | Steck |
| 5,971,967 A | 10/1999 | Willard |
| 6,010,514 A | 1/2000 | Burney et al. |
| 6,011,525 A | 1/2000 | Piole |
| 6,015,428 A | 1/2000 | Pagedas |
| 6,024,751 A | 2/2000 | Lovato et al. |
| 6,030,393 A | 2/2000 | Corlew |
| 6,033,413 A | 3/2000 | Mikus et al. |
| 6,033,430 A | 3/2000 | Bonutti |
| 6,036,701 A | 3/2000 | Rosenman |
| 6,048,351 A | 4/2000 | Gordon et al. |
| 6,053,908 A | 4/2000 | Crainich et al. |
| 6,053,935 A | 4/2000 | Brenneman et al. |
| 6,056,700 A * | 5/2000 | Burney .................. A61B 90/39 |
| | | 604/63 |
| 6,056,722 A | 5/2000 | Jayaraman |
| 6,056,772 A | 5/2000 | Bonutti |
| 6,066,160 A | 5/2000 | Colvin et al. |
| 6,068,648 A | 5/2000 | Cole et al. |
| 6,080,167 A | 6/2000 | Lyell |
| 6,086,608 A | 7/2000 | Ek et al. |
| 6,110,183 A | 8/2000 | Cope |
| 6,117,133 A | 9/2000 | Zappala |
| 6,117,160 A | 9/2000 | Bonutti |
| 6,117,161 A | 9/2000 | Li et al. |
| 6,120,539 A | 9/2000 | Eldridge et al. |
| 6,132,438 A | 10/2000 | Fleischman et al. |
| 6,139,555 A | 10/2000 | Hart et al. |
| RE36,974 E | 11/2000 | Bonutti |
| 6,143,006 A | 11/2000 | Chan |
| 6,152,935 A | 11/2000 | Kammerer et al. |
| 6,156,044 A | 12/2000 | Kammerer et al. |
| 6,156,049 A | 12/2000 | Lovato et al. |
| 6,159,207 A | 12/2000 | Yoon |
| 6,159,234 A | 12/2000 | Bonutti et al. |
| 6,193,714 B1 | 2/2001 | McGaffigan et al. |
| 6,200,329 B1 | 3/2001 | Fung et al. |
| 6,203,565 B1 | 3/2001 | Bonutti et al. |
| 6,206,895 B1 | 3/2001 | Levinson |
| 6,206,907 B1 | 3/2001 | Marino et al. |
| 6,228,096 B1 | 5/2001 | Marchand |
| 6,235,024 B1 | 5/2001 | Tu |
| 6,258,124 B1 | 7/2001 | Darois et al. |
| 6,261,302 B1 | 7/2001 | Voegele et al. |
| 6,261,320 B1 | 7/2001 | Tam et al. |
| 6,270,530 B1 | 8/2001 | Eldridge et al. |
| 6,280,441 B1 | 8/2001 | Ryan |
| 6,280,460 B1 | 8/2001 | Bolduc et al. |
| 6,287,317 B1 | 9/2001 | Makower et al. |
| 6,290,711 B1 | 9/2001 | Caspari et al. |
| 6,295,990 B1 | 10/2001 | Lewis et al. |
| 6,306,158 B1 | 10/2001 | Bartlett |
| 6,312,448 B1 | 11/2001 | Bonutti |
| 6,319,263 B1 | 11/2001 | Levinson |
| 6,322,112 B1 | 11/2001 | Duncan |
| 6,332,889 B1 | 12/2001 | Sancoff et al. |
| 6,382,214 B1 | 5/2002 | Raz et al. |
| 6,387,041 B1 | 5/2002 | Harari et al. |
| 6,398,795 B1 | 6/2002 | McAlister et al. |
| 6,398,796 B2 | 6/2002 | Levinson |
| 6,423,079 B1 | 7/2002 | Blake, III |
| 6,425,900 B1 | 7/2002 | Knodel et al. |
| 6,425,919 B1 | 7/2002 | Lambrecht |
| 6,428,538 B1 | 8/2002 | Blewett et al. |
| 6,428,562 B2 | 8/2002 | Bonutti |
| 6,436,107 B1 | 8/2002 | Wang et al. |
| 6,461,355 B2 | 10/2002 | Svejkovsky et al. |
| 6,482,235 B1 | 11/2002 | Lambrecht et al. |
| 6,488,691 B1 | 12/2002 | Carroll et al. |
| 6,491,672 B2 | 12/2002 | Slepian et al. |
| 6,491,707 B2 | 12/2002 | Makower et al. |
| 6,494,888 B1 | 12/2002 | Aufer et al. |
| 6,500,184 B1 | 12/2002 | Chan et al. |
| 6,500,195 B2 | 12/2002 | Bonutti |
| 6,506,190 B1 | 1/2003 | Walshe |
| 6,506,196 B1 | 1/2003 | Laufer |
| 6,514,247 B1 | 2/2003 | McGaffigan et al. |
| 6,517,569 B2 | 2/2003 | Mikus et al. |
| 6,527,702 B2 | 3/2003 | Whalen et al. |
| 6,527,794 B1 | 3/2003 | McDevitt et al. |
| 6,530,932 B1 | 3/2003 | Swayze et al. |
| 6,530,933 B1 | 3/2003 | Yeung et al. |
| 6,533,796 B1 | 3/2003 | Sauer et al. |
| 6,544,230 B1 | 4/2003 | Flaherty et al. |

(56) References Cited

U.S. PATENT DOCUMENTS

| | | |
|---|---|---|
| 6,547,725 B1 | 4/2003 | Paolitto et al. |
| 6,551,328 B2 | 4/2003 | Kortenbach |
| 6,551,333 B2 | 4/2003 | Kuhns et al. |
| 6,565,578 B1 | 5/2003 | Peifer et al. |
| 6,569,187 B1 | 5/2003 | Bonutti et al. |
| 6,572,626 B1 | 6/2003 | Knodel et al. |
| 6,572,635 B1 | 6/2003 | Bonutti |
| 6,572,653 B1 | 6/2003 | Simonson |
| 6,582,453 B1 | 6/2003 | Tran et al. |
| 6,592,609 B1 | 7/2003 | Bonutti |
| 6,595,911 B2 | 7/2003 | LoVuolo |
| 6,596,013 B2 | 7/2003 | Yang et al. |
| 6,599,311 B1 | 7/2003 | Biggs et al. |
| 6,626,913 B1 | 9/2003 | Mckinnon et al. |
| 6,626,916 B1 | 9/2003 | Yeung et al. |
| 6,626,919 B1 | 9/2003 | Swanstrom |
| 6,629,534 B1 | 10/2003 | Goar et al. |
| 6,638,275 B1 | 10/2003 | McGaffigan et al. |
| 6,641,524 B2 | 11/2003 | Kovac |
| 6,641,592 B1 | 11/2003 | Sauer et al. |
| 6,656,182 B1 | 12/2003 | Hayhurst |
| 6,660,008 B1 | 12/2003 | Foerster et al. |
| 6,660,023 B2 | 12/2003 | McDevitt et al. |
| 6,663,589 B1 | 12/2003 | Halevy |
| 6,663,633 B1 | 12/2003 | Pierson |
| 6,663,639 B1 | 12/2003 | Laufer et al. |
| 6,699,263 B2 | 3/2004 | Cope |
| 6,702,846 B2 | 3/2004 | Mikus et al. |
| 6,706,047 B2 | 3/2004 | Trout et al. |
| 6,709,493 B2 | 3/2004 | DeGuiseppi et al. |
| 6,715,804 B2 | 4/2004 | Beers |
| 6,716,252 B2 | 4/2004 | Lazarovitz et al. |
| 6,719,709 B2 | 4/2004 | Whalen et al. |
| 6,730,112 B2 | 5/2004 | Levinson |
| 6,736,823 B2 | 5/2004 | Darois et al. |
| 6,736,854 B2 | 5/2004 | Vadurro et al. |
| 6,740,098 B2 | 5/2004 | Abrams et al. |
| 6,767,037 B2 | 7/2004 | Wenstrom |
| 6,770,076 B2 | 8/2004 | Foerster |
| 6,770,101 B2 | 8/2004 | Desmond, III et al. |
| 6,773,438 B1 | 8/2004 | Knodel et al. |
| 6,773,441 B1 | 8/2004 | Laufer et al. |
| 6,790,213 B2 | 9/2004 | Cherok et al. |
| 6,790,223 B2 | 9/2004 | Reever |
| 6,802,838 B2 | 10/2004 | Loeb et al. |
| 6,802,846 B2 | 10/2004 | Hauschild et al. |
| 6,821,282 B2 | 11/2004 | Perry et al. |
| 6,821,285 B2 | 11/2004 | Laufer et al. |
| 6,821,291 B2 | 11/2004 | Bolea et al. |
| 6,835,200 B2 | 12/2004 | Laufer et al. |
| 6,905,475 B2 | 6/2005 | Hauschild et al. |
| 6,908,473 B2 | 6/2005 | Skiba et al. |
| 6,921,361 B2 | 7/2005 | Suzuki et al. |
| 6,926,732 B2 | 8/2005 | Derus et al. |
| 6,951,565 B2 | 10/2005 | Keane et al. |
| 6,986,775 B2 | 1/2006 | Morales et al. |
| 6,986,784 B1 | 1/2006 | Weiser et al. |
| 6,988,983 B2 | 1/2006 | Connors et al. |
| 6,991,596 B2 | 1/2006 | Whalen et al. |
| 6,991,647 B2 | 1/2006 | Jadhav |
| 6,997,940 B2 | 2/2006 | Bonutti |
| 7,001,327 B2 | 2/2006 | Whalen et al. |
| 7,004,965 B2 | 2/2006 | Gross |
| 7,008,381 B2 | 3/2006 | Janssens |
| 7,011,688 B2 | 3/2006 | Gryska et al. |
| 7,015,253 B2 | 3/2006 | Escandon et al. |
| 7,041,111 B2 | 5/2006 | Chu |
| 7,048,698 B2 | 5/2006 | Whalen et al. |
| 7,048,747 B2 | 5/2006 | Arcia et al. |
| 7,060,077 B2 | 6/2006 | Gordon et al. |
| 7,063,715 B2 | 6/2006 | Onuki et al. |
| 7,065,325 B2 | 6/2006 | Zegelin et al. |
| 7,081,126 B2 | 7/2006 | McDevitt et al. |
| 7,083,638 B2 | 8/2006 | Foerster |
| 7,087,073 B2 | 8/2006 | Bonutti |
| 7,089,064 B2 | 8/2006 | Manker et al. |
| 7,090,690 B2 | 8/2006 | Foerster et al. |
| 7,093,601 B2 | 8/2006 | Manker et al. |
| 7,096,301 B2 | 8/2006 | Beaudoin et al. |
| 7,104,949 B2 | 9/2006 | Anderson et al. |
| 7,105,004 B2 | 9/2006 | DiCesare et al. |
| 7,108,655 B2 | 9/2006 | Whalen et al. |
| 7,112,226 B2 | 9/2006 | Gellman |
| 7,141,038 B2 | 11/2006 | Whalen et al. |
| 7,153,314 B2 | 12/2006 | Laufer et al. |
| 7,179,225 B2 | 2/2007 | Shluzas et al. |
| 7,220,274 B1 | 5/2007 | Quinn |
| 7,226,558 B2 | 6/2007 | Nieman et al. |
| 7,232,448 B2 | 6/2007 | Battles et al. |
| 7,255,675 B2 | 8/2007 | Gertner et al. |
| 7,261,709 B2 | 8/2007 | Swoyer et al. |
| 7,261,710 B2 | 8/2007 | Elmouelhi et al. |
| 7,282,020 B2 | 10/2007 | Kaplan |
| 7,288,063 B2 | 10/2007 | Petros et al. |
| 7,303,108 B2 | 12/2007 | Shelton |
| 7,320,701 B2 | 1/2008 | Haut et al. |
| 7,322,974 B2 | 1/2008 | Swoyer et al. |
| 7,326,221 B2 | 2/2008 | Sakamoto et al. |
| 7,334,822 B1 | 2/2008 | Hines |
| 7,335,197 B2 | 2/2008 | Sage et al. |
| 7,340,300 B2 | 3/2008 | Christopherson et al. |
| 7,399,304 B2 | 7/2008 | Gambale et al. |
| 7,402,166 B2 | 7/2008 | Feigl |
| 7,416,554 B2 | 8/2008 | Lam et al. |
| 7,417,175 B2 | 8/2008 | Oda et al. |
| 7,437,194 B2 | 10/2008 | Skwarek et al. |
| 7,463,934 B2 | 12/2008 | Tronnes et al. |
| 7,470,228 B2 | 12/2008 | Connors et al. |
| 7,481,771 B2 | 1/2009 | Fonseca et al. |
| 7,485,124 B2 | 2/2009 | Kuhns et al. |
| 7,553,317 B2 | 6/2009 | William et al. |
| 7,608,108 B2 | 10/2009 | Bhatnagar et al. |
| 7,632,297 B2 | 12/2009 | Gross |
| 7,645,286 B2 | 1/2010 | Catanese et al. |
| 7,658,311 B2 | 2/2010 | Boudreaux |
| 7,666,197 B2 | 2/2010 | Orban |
| 7,674,275 B2 | 3/2010 | Martin et al. |
| 7,682,374 B2 | 3/2010 | Foerster et al. |
| 7,695,494 B2 | 4/2010 | Foerster |
| 7,704,261 B2 | 4/2010 | Sakamoto et al. |
| 7,727,248 B2 | 6/2010 | Smith et al. |
| 7,731,725 B2 | 6/2010 | Gadberry et al. |
| 7,736,374 B2 | 6/2010 | Vaughan et al. |
| 7,758,594 B2 | 7/2010 | Lamson et al. |
| 7,766,923 B2 | 8/2010 | Catanese et al. |
| 7,766,939 B2 | 8/2010 | Yeung et al. |
| 7,780,682 B2 | 8/2010 | Catanese et al. |
| 7,780,687 B2 | 8/2010 | Heinrich et al. |
| 7,794,494 B2 | 9/2010 | Sahatjian et al. |
| 7,815,655 B2 | 10/2010 | Catanese et al. |
| 7,850,712 B2 | 12/2010 | Conlon et al. |
| 7,862,542 B1 | 1/2011 | Harmon |
| 7,862,584 B2 | 1/2011 | Lyons et al. |
| 7,887,551 B2 | 2/2011 | Bojarski et al. |
| 7,896,891 B2 | 3/2011 | Catanese et al. |
| 7,905,889 B2 | 3/2011 | Catanese et al. |
| 7,905,904 B2 | 3/2011 | Stone et al. |
| 7,909,836 B2 | 3/2011 | McLean et al. |
| 7,914,542 B2 | 3/2011 | Lamson et al. |
| 7,922,645 B2 | 4/2011 | Kaplan |
| 7,951,158 B2 | 5/2011 | Catanese et al. |
| 8,007,503 B2 | 8/2011 | Catanese et al. |
| 8,043,309 B2 | 10/2011 | Catanese et al. |
| 8,114,070 B2 | 2/2012 | Rubinsky et al. |
| 8,145,321 B2 | 3/2012 | Gross |
| 8,152,804 B2 | 4/2012 | Elmouelhi et al. |
| 8,157,815 B2 | 4/2012 | Catanese et al. |
| 8,162,960 B2 | 4/2012 | Manzo |
| 8,167,830 B2 | 5/2012 | Noriega |
| 8,211,118 B2 | 7/2012 | Catanese et al. |
| 8,216,254 B2 | 7/2012 | McLean et al. |
| 8,236,011 B2 | 8/2012 | Harris et al. |
| 8,251,985 B2 | 8/2012 | Hoey et al. |
| 8,273,079 B2 | 9/2012 | Hoey et al. |

(56) References Cited

U.S. PATENT DOCUMENTS

| | | |
|---|---|---|
| 8,298,132 B2 | 10/2012 | Connors et al. |
| 8,303,604 B2 | 11/2012 | Stone et al. |
| 8,308,765 B2 | 11/2012 | Saadat et al. |
| 8,333,776 B2 | 12/2012 | Cheng et al. |
| 8,343,187 B2 | 1/2013 | Amson et al. |
| 8,361,112 B2 | 1/2013 | Kempton et al. |
| 8,372,065 B2 | 2/2013 | Hoey et al. |
| 8,388,611 B2 | 3/2013 | Shadduck et al. |
| 8,388,653 B2 | 3/2013 | Nobis et al. |
| 8,394,110 B2 | 3/2013 | Catanese et al. |
| 8,394,113 B2 | 3/2013 | Wei et al. |
| 8,419,723 B2 | 4/2013 | Shadduck et al. |
| 8,425,535 B2 | 4/2013 | McLean et al. |
| 8,444,657 B2 | 5/2013 | Saadat et al. |
| 8,454,655 B2 | 6/2013 | Yeung et al. |
| 8,465,551 B1 | 6/2013 | Wijay et al. |
| 8,480,686 B2 | 7/2013 | Bakos et al. |
| 8,491,606 B2 | 7/2013 | Tong et al. |
| 8,496,684 B2 | 7/2013 | Crainich et al. |
| 8,521,257 B2 | 8/2013 | Whitcomb et al. |
| 8,529,584 B2 | 9/2013 | Catanese et al. |
| 8,529,588 B2 | 9/2013 | Ahlberg et al. |
| 8,562,646 B2 | 10/2013 | Gellman et al. |
| 8,585,692 B2 | 11/2013 | Shadduck et al. |
| 8,603,106 B2 | 12/2013 | Catanese et al. |
| 8,603,123 B2 | 12/2013 | Todd |
| 8,603,187 B2 | 12/2013 | Kilemnick et al. |
| 8,628,542 B2 | 1/2014 | Merrick et al. |
| 8,663,243 B2 | 3/2014 | Lamson et al. |
| 8,668,705 B2 | 3/2014 | Johnston et al. |
| 8,683,895 B2 | 4/2014 | Nash |
| 8,715,239 B2 | 5/2014 | Lamson et al. |
| 8,715,298 B2 | 5/2014 | Catanese et al. |
| 8,734,469 B2 | 5/2014 | Pribanic et al. |
| 8,790,356 B2 | 7/2014 | Darois et al. |
| 8,801,702 B2 | 8/2014 | Hoey et al. |
| 8,808,363 B2 | 8/2014 | Perry et al. |
| 8,814,856 B2 | 8/2014 | Elmouelhi et al. |
| 8,828,035 B2 | 9/2014 | Kim |
| 8,834,458 B2 | 9/2014 | Neuberger et al. |
| 8,880,195 B2 | 11/2014 | Azure |
| 8,900,293 B2 | 12/2014 | Forbes et al. |
| 8,920,437 B2 | 12/2014 | Harris et al. |
| 8,926,494 B1 | 1/2015 | Cook et al. |
| 8,945,114 B2 | 2/2015 | Elmouelhi et al. |
| 9,034,001 B2 | 5/2015 | Cheng et al. |
| 9,039,740 B2 | 5/2015 | Wales et al. |
| 9,089,320 B2 | 7/2015 | Spivey et al. |
| 9,150,817 B2 | 10/2015 | Furihata et al. |
| 9,179,991 B2 | 11/2015 | Gozzi et al. |
| 9,204,922 B2 | 12/2015 | Hooven |
| 9,211,155 B2 | 12/2015 | Fruland et al. |
| 9,220,874 B2 | 12/2015 | Pillai et al. |
| 9,272,140 B2 | 3/2016 | Gerber |
| 9,277,914 B2 | 3/2016 | Wales et al. |
| 9,345,507 B2 | 5/2016 | Hoey et al. |
| 9,345,867 B2 | 5/2016 | Browning |
| 9,393,007 B2 | 7/2016 | Darois et al. |
| 9,439,643 B2 | 9/2016 | Darois et al. |
| 9,459,751 B2 | 10/2016 | Weaver et al. |
| 9,504,461 B2 | 11/2016 | Catanese et al. |
| 9,526,555 B2 | 12/2016 | Hoey et al. |
| 9,549,739 B2 | 1/2017 | Catanese et al. |
| 9,561,025 B2 | 2/2017 | Stone et al. |
| 9,592,044 B2 | 3/2017 | Weir et al. |
| 9,597,145 B2 | 3/2017 | Nelson et al. |
| 9,668,803 B2 | 6/2017 | Bhushan et al. |
| 9,675,373 B2 | 6/2017 | Todd |
| 9,750,492 B2 | 9/2017 | Ziniti et al. |
| 9,931,192 B2 | 4/2018 | McLean et al. |
| 10,130,353 B2 | 11/2018 | Catanese et al. |
| 10,575,844 B2 | 3/2020 | Lamson et al. |
| 10,702,261 B2 | 7/2020 | Stiggelbout |
| 11,331,093 B2 | 5/2022 | Catanese et al. |
| 11,504,149 B2 | 11/2022 | Merrick et al. |
| 11,672,520 B2 | 6/2023 | Lamson et al. |
| 11,850,140 B2 | 12/2023 | Lamson et al. |
| 12,042,372 B2 | 7/2024 | Lamson et al. |
| 2001/0021835 A1 | 9/2001 | Mitchell et al. |
| 2001/0041916 A1 | 11/2001 | Bonutti |
| 2001/0044639 A1 | 11/2001 | Levinson |
| 2002/0049453 A1 | 4/2002 | Nobles et al. |
| 2002/0095064 A1 | 7/2002 | Beyar |
| 2002/0095154 A1 | 7/2002 | Atkinson et al. |
| 2002/0107540 A1 | 8/2002 | Whalen et al. |
| 2002/0128684 A1 | 9/2002 | Foerster |
| 2002/0151967 A1 | 10/2002 | Mikus et al. |
| 2002/0161382 A1 | 10/2002 | Neisz et al. |
| 2002/0177866 A1 | 11/2002 | Weikel et al. |
| 2002/0183740 A1 | 12/2002 | Edwards et al. |
| 2002/0193809 A1 | 12/2002 | Meade et al. |
| 2003/0023248 A1 | 1/2003 | Parodi |
| 2003/0040803 A1 | 2/2003 | Rioux et al. |
| 2003/0060819 A1 | 3/2003 | McGovern et al. |
| 2003/0078601 A1 | 4/2003 | Shikhman et al. |
| 2003/0109769 A1 | 6/2003 | Lowery et al. |
| 2003/0120309 A1 | 6/2003 | Colleran et al. |
| 2003/0130575 A1 | 7/2003 | Desai |
| 2003/0144570 A1 | 7/2003 | Hunter et al. |
| 2003/0176883 A1 | 9/2003 | Sauer et al. |
| 2003/0181800 A1* | 9/2003 | Bonutti .............. A61B 17/8858 600/407 |
| 2003/0191479 A1 | 10/2003 | Thornton |
| 2003/0191497 A1 | 10/2003 | Cope |
| 2003/0199860 A1 | 10/2003 | Loeb et al. |
| 2003/0204195 A1 | 10/2003 | Keane et al. |
| 2003/0229263 A1 | 12/2003 | Connors et al. |
| 2003/0236535 A1 | 12/2003 | Onuki et al. |
| 2004/0010301 A1 | 1/2004 | Kindlein et al. |
| 2004/0030217 A1 | 2/2004 | Yeung et al. |
| 2004/0043052 A1 | 3/2004 | Hunter et al. |
| 2004/0044350 A1 | 3/2004 | Martin et al. |
| 2004/0078046 A1 | 4/2004 | Barzell et al. |
| 2004/0092978 A1 | 5/2004 | Surti |
| 2004/0122456 A1 | 6/2004 | Saadat et al. |
| 2004/0122474 A1 | 6/2004 | Gellman et al. |
| 2004/0143343 A1 | 7/2004 | Grocela |
| 2004/0147958 A1 | 7/2004 | Lam et al. |
| 2004/0162568 A1 | 8/2004 | Saadat et al. |
| 2004/0167635 A1 | 8/2004 | Yachia et al. |
| 2004/0172046 A1 | 9/2004 | Hlavka et al. |
| 2004/0181235 A1 | 9/2004 | Daignault et al. |
| 2004/0193191 A1 | 9/2004 | Starksen et al. |
| 2004/0193194 A1 | 9/2004 | Laufer et al. |
| 2004/0193196 A1 | 9/2004 | Appling et al. |
| 2004/0194790 A1 | 10/2004 | Laufer et al. |
| 2004/0215179 A1 | 10/2004 | Swoyer et al. |
| 2004/0215181 A1 | 10/2004 | Christopherson et al. |
| 2004/0225305 A1 | 11/2004 | Ewers et al. |
| 2004/0230316 A1 | 11/2004 | Cioanta et al. |
| 2004/0243178 A1 | 12/2004 | Haut et al. |
| 2004/0243179 A1 | 12/2004 | Foerster |
| 2004/0243180 A1 | 12/2004 | Donnelly et al. |
| 2004/0243227 A1 | 12/2004 | Starksen et al. |
| 2004/0260345 A1 | 12/2004 | Foerster |
| 2005/0010203 A1 | 1/2005 | Edwards et al. |
| 2005/0013805 A1 | 1/2005 | Tavori |
| 2005/0033403 A1 | 2/2005 | Ward et al. |
| 2005/0055087 A1 | 3/2005 | Starksen |
| 2005/0059929 A1 | 3/2005 | Bolmsjo et al. |
| 2005/0065550 A1 | 3/2005 | Starksen et al. |
| 2005/0080454 A1 | 4/2005 | Drews et al. |
| 2005/0101982 A1 | 5/2005 | Ravenscroft et al. |
| 2005/0107811 A1 | 5/2005 | Starksen et al. |
| 2005/0107812 A1 | 5/2005 | Starksen et al. |
| 2005/0137716 A1 | 6/2005 | Gross |
| 2005/0154401 A1 | 7/2005 | Weldon et al. |
| 2005/0165272 A1 | 7/2005 | Okada et al. |
| 2005/0171522 A1 | 8/2005 | Christopherson |
| 2005/0177181 A1 | 8/2005 | Kagan et al. |
| 2005/0192652 A1 | 9/2005 | Cioanta et al. |
| 2005/0203344 A1 | 9/2005 | Orban et al. |
| 2005/0203550 A1 | 9/2005 | Laufer et al. |

(56) References Cited

U.S. PATENT DOCUMENTS

| | | |
|---|---|---|
| 2005/0203552 A1* | 9/2005 | Laufer .................. A61B 17/10 606/157 |
| 2005/0216040 A1 | 9/2005 | Gertner et al. |
| 2005/0216078 A1 | 9/2005 | Starksen et al. |
| 2005/0222557 A1 | 10/2005 | Baxter et al. |
| 2005/0251157 A1 | 11/2005 | Saadat et al. |
| 2005/0251159 A1 | 11/2005 | Ewers et al. |
| 2005/0251177 A1 | 11/2005 | Saadat et al. |
| 2005/0251206 A1* | 11/2005 | Maahs .................. A61B 17/08 606/232 |
| 2005/0256530 A1 | 11/2005 | Petros |
| 2005/0267405 A1 | 12/2005 | Shah |
| 2005/0273138 A1 | 12/2005 | To et al. |
| 2005/0283189 A1 | 12/2005 | Rosenblatt |
| 2005/0288694 A1 | 12/2005 | Solomon |
| 2006/0004410 A1 | 1/2006 | Nobis et al. |
| 2006/0009800 A1* | 1/2006 | Christianson ...... A61B 17/0057 606/213 |
| 2006/0020276 A1 | 1/2006 | Saadat et al. |
| 2006/0020327 A1 | 1/2006 | Lashinski et al. |
| 2006/0025750 A1 | 2/2006 | Starksen et al. |
| 2006/0025784 A1 | 2/2006 | Starksen et al. |
| 2006/0025789 A1 | 2/2006 | Laufer et al. |
| 2006/0025819 A1 | 2/2006 | Nobis et al. |
| 2006/0026750 A1 | 2/2006 | Ballance |
| 2006/0030884 A1 | 2/2006 | Yeung et al. |
| 2006/0058817 A1 | 3/2006 | Starksen et al. |
| 2006/0079880 A1 | 4/2006 | Sage et al. |
| 2006/0079881 A1 | 4/2006 | Christopherson et al. |
| 2006/0089636 A1 | 4/2006 | Christopherson et al. |
| 2006/0089646 A1 | 4/2006 | Bonutti |
| 2006/0095058 A1 | 5/2006 | Sivan et al. |
| 2006/0155308 A1 | 7/2006 | Griego |
| 2006/0167477 A1 | 7/2006 | Arcia et al. |
| 2006/0167533 A1 | 7/2006 | Spraker et al. |
| 2006/0178680 A1 | 8/2006 | Nelson et al. |
| 2006/0189940 A1 | 8/2006 | Kirsch |
| 2006/0195008 A1 | 8/2006 | Whalen et al. |
| 2006/0199996 A1 | 9/2006 | Caraballo et al. |
| 2006/0241694 A1 | 10/2006 | Cerundolo |
| 2006/0265042 A1* | 11/2006 | Catanese, III ... A61B 17/06109 623/1.11 |
| 2006/0271032 A1 | 11/2006 | Chin et al. |
| 2006/0276481 A1 | 12/2006 | Evrard et al. |
| 2006/0276871 A1* | 12/2006 | Lamson .................. A61B 17/42 623/1.11 |
| 2006/0282081 A1 | 12/2006 | Fanton et al. |
| 2007/0010857 A1* | 1/2007 | Sugimoto ........ A61B 17/00234 606/232 |
| 2007/0049929 A1 | 3/2007 | Catanese et al. |
| 2007/0049970 A1 | 3/2007 | Belef et al. |
| 2007/0060931 A1 | 3/2007 | Hamilton et al. |
| 2007/0073322 A1 | 3/2007 | Mikkaichi et al. |
| 2007/0073342 A1 | 3/2007 | Stone et al. |
| 2007/0088362 A1 | 4/2007 | Bonutti et al. |
| 2007/0100421 A1 | 5/2007 | Griffin |
| 2007/0110665 A1* | 5/2007 | Bolan .................. A61K 49/0002 424/9.4 |
| 2007/0112385 A1 | 5/2007 | Conlon |
| 2007/0112423 A1 | 5/2007 | Chu |
| 2007/0142846 A1 | 6/2007 | Catanese et al. |
| 2007/0173888 A1 | 7/2007 | Gertner et al. |
| 2007/0179491 A1 | 8/2007 | Kratoska et al. |
| 2007/0179496 A1 | 8/2007 | Swoyer et al. |
| 2007/0198038 A1 | 8/2007 | Cohen et al. |
| 2007/0260259 A1 | 11/2007 | Fanton et al. |
| 2008/0009888 A1 | 1/2008 | Ewers et al. |
| 2008/0021445 A1 | 1/2008 | Elmouelhi et al. |
| 2008/0021485 A1 | 1/2008 | Catanese et al. |
| 2008/0033458 A1 | 2/2008 | McLean et al. |
| 2008/0033488 A1 | 2/2008 | Catanese et al. |
| 2008/0039833 A1 | 2/2008 | Catanese et al. |
| 2008/0039872 A1 | 2/2008 | Catanese et al. |
| 2008/0039874 A1 | 2/2008 | Catanese et al. |
| 2008/0039875 A1 | 2/2008 | Catanese et al. |
| 2008/0039893 A1 | 2/2008 | McLean et al. |
| 2008/0039894 A1 | 2/2008 | Catanese et al. |
| 2008/0039921 A1 | 2/2008 | Wallsten et al. |
| 2008/0045978 A1 | 2/2008 | Kuhns et al. |
| 2008/0051810 A1 | 2/2008 | To et al. |
| 2008/0058710 A1 | 3/2008 | Wilk |
| 2008/0065120 A1 | 3/2008 | Pannis et al. |
| 2008/0082113 A1 | 4/2008 | Bishop et al. |
| 2008/0086172 A1 | 4/2008 | Martin et al. |
| 2008/0091220 A1 | 4/2008 | Chu |
| 2008/0091237 A1 | 4/2008 | Schwartz et al. |
| 2008/0119874 A1 | 5/2008 | Merves |
| 2008/0154378 A1 | 6/2008 | Pelo |
| 2008/0161852 A1 | 7/2008 | Kaiser et al. |
| 2008/0195145 A1 | 8/2008 | Bonutti et al. |
| 2008/0208220 A1 | 8/2008 | Shiono et al. |
| 2008/0221388 A1 | 9/2008 | Seibel et al. |
| 2008/0228202 A1 | 9/2008 | Cropper et al. |
| 2008/0262424 A1 | 10/2008 | Hooft |
| 2008/0269737 A1 | 10/2008 | Elmouelhi et al. |
| 2009/0012537 A1 | 1/2009 | Green |
| 2009/0018553 A1 | 1/2009 | McLean et al. |
| 2009/0060977 A1 | 3/2009 | Lamson et al. |
| 2009/0112234 A1 | 4/2009 | Crainich et al. |
| 2009/0112537 A1 | 4/2009 | Okumura |
| 2009/0118762 A1 | 5/2009 | Crainch et al. |
| 2009/0163934 A1 | 6/2009 | Raschdorf, Jr. et al. |
| 2009/0177288 A1 | 7/2009 | Wallsten |
| 2009/0198227 A1 | 8/2009 | Prakash |
| 2009/0204128 A1 | 8/2009 | Lamson et al. |
| 2010/0010631 A1 | 1/2010 | Otte et al. |
| 2010/0023022 A1 | 1/2010 | Zeiner et al. |
| 2010/0023024 A1 | 1/2010 | Zeiner et al. |
| 2010/0023025 A1 | 1/2010 | Zeiner et al. |
| 2010/0023026 A1 | 1/2010 | Zeiner et al. |
| 2010/0030262 A1 | 2/2010 | McLean et al. |
| 2010/0030263 A1* | 2/2010 | Cheng ................ A61B 17/0401 606/232 |
| 2010/0049188 A1 | 2/2010 | Nelson et al. |
| 2010/0063351 A1 | 3/2010 | Witzmann et al. |
| 2010/0063542 A1 | 3/2010 | Burg et al. |
| 2010/0114162 A1 | 5/2010 | Bojarski et al. |
| 2010/0130815 A1 | 5/2010 | Gross et al. |
| 2010/0191045 A1 | 7/2010 | Gobron et al. |
| 2010/0240951 A1 | 9/2010 | Catanese et al. |
| 2010/0256442 A1 | 10/2010 | Ogdahl et al. |
| 2010/0261950 A1 | 10/2010 | Lund et al. |
| 2010/0286106 A1 | 11/2010 | Gat et al. |
| 2010/0286679 A1 | 11/2010 | Hoey et al. |
| 2010/0286717 A1 | 11/2010 | Heinrich et al. |
| 2010/0298948 A1 | 11/2010 | Hoey et al. |
| 2010/0324669 A1 | 12/2010 | Hlavka et al. |
| 2011/0040312 A1 | 2/2011 | Lamson et al. |
| 2011/0046648 A1 | 2/2011 | Johnston et al. |
| 2011/0060349 A1 | 3/2011 | Cheng et al. |
| 2011/0077676 A1 | 3/2011 | Sivan et al. |
| 2011/0082471 A1 | 4/2011 | Holcomb et al. |
| 2011/0105841 A1 | 5/2011 | Kutikov et al. |
| 2011/0144423 A1 | 6/2011 | Tong et al. |
| 2011/0152839 A1 | 6/2011 | Cima et al. |
| 2011/0160747 A1 | 6/2011 | McLean et al. |
| 2011/0166564 A1 | 7/2011 | Merrick et al. |
| 2011/0172755 A1 | 7/2011 | Nelson et al. |
| 2011/0190758 A1 | 8/2011 | Lamson et al. |
| 2011/0196393 A1 | 8/2011 | Eliachar et al. |
| 2011/0202052 A1 | 8/2011 | Gelbart et al. |
| 2011/0218387 A1 | 9/2011 | Lamson et al. |
| 2011/0245828 A1 | 10/2011 | Baxter et al. |
| 2011/0276081 A1 | 11/2011 | Kilemnik |
| 2011/0276086 A1 | 11/2011 | Al-Qbandi et al. |
| 2012/0010645 A1 | 1/2012 | Feld |
| 2012/0041533 A1 | 2/2012 | Bertolino et al. |
| 2012/0041534 A1 | 2/2012 | Clerc et al. |
| 2012/0059387 A1 | 3/2012 | Schanz et al. |
| 2012/0165837 A1 | 6/2012 | Belman et al. |
| 2012/0203250 A1 | 8/2012 | Weir et al. |
| 2012/0245600 A1 | 9/2012 | McLean et al. |
| 2012/0265006 A1 | 10/2012 | Makower et al. |

(56) References Cited

U.S. PATENT DOCUMENTS

| | | |
|---|---|---|
| 2013/0096582 A1 | 4/2013 | Cheng et al. |
| 2013/0178871 A1 | 7/2013 | Koogle et al. |
| 2013/0197547 A1 | 8/2013 | Fukuoka et al. |
| 2013/0211431 A1 | 8/2013 | Wei et al. |
| 2013/0253574 A1 | 9/2013 | Catanese et al. |
| 2013/0253662 A1 | 9/2013 | Lamson et al. |
| 2013/0261383 A1 | 10/2013 | Catanese et al. |
| 2013/0261665 A1 | 10/2013 | Yeung et al. |
| 2013/0267772 A1 | 10/2013 | Catanese et al. |
| 2013/0268001 A1 | 10/2013 | Catanese et al. |
| 2013/0274799 A1 | 10/2013 | Catanese et al. |
| 2013/0289342 A1 | 10/2013 | Tong et al. |
| 2013/0296639 A1 | 11/2013 | Lamson et al. |
| 2013/0296889 A1 | 11/2013 | Tong et al. |
| 2013/0296935 A1 | 11/2013 | McLean et al. |
| 2013/0325143 A1 | 12/2013 | Lamson et al. |
| 2014/0005473 A1 | 1/2014 | Catanese et al. |
| 2014/0005690 A1 | 1/2014 | Catanese et al. |
| 2014/0012192 A1 | 1/2014 | Bar-On et al. |
| 2014/0031835 A1 | 1/2014 | Viker et al. |
| 2014/0088587 A1 | 3/2014 | Merrick et al. |
| 2014/0180067 A1 | 6/2014 | Stigall et al. |
| 2014/0207179 A1 | 7/2014 | Farhangnia et al. |
| 2014/0221981 A1 | 8/2014 | Cima et al. |
| 2014/0236230 A1 | 8/2014 | Johnston et al. |
| 2014/0275756 A1 | 9/2014 | Bender et al. |
| 2014/0288637 A1 | 9/2014 | Clerc et al. |
| 2014/0296881 A1 | 10/2014 | Ranucci et al. |
| 2015/0025652 A1 | 1/2015 | McLean et al. |
| 2015/0112299 A1 | 4/2015 | Forbes et al. |
| 2015/0127050 A1 | 5/2015 | Lamson et al. |
| 2015/0157309 A1 | 6/2015 | Bird |
| 2015/0257908 A1 | 9/2015 | Chao et al. |
| 2015/0297213 A1* | 10/2015 | Lehtinen ............ A61B 17/0401 606/232 |
| 2015/0335393 A1 | 11/2015 | Ciulla et al. |
| 2015/0351743 A1 | 12/2015 | Stiggelbout |
| 2016/0000455 A1 | 1/2016 | Golan et al. |
| 2016/0022265 A1 | 1/2016 | Kawaura et al. |
| 2016/0038087 A1 | 2/2016 | Hunter |
| 2016/0045297 A1 | 2/2016 | Siegel et al. |
| 2016/0051735 A1 | 2/2016 | Slepian |
| 2016/0081736 A1 | 3/2016 | Hoey et al. |
| 2016/0089140 A1 | 3/2016 | Kawaura et al. |
| 2016/0095685 A1 | 4/2016 | Vemuri et al. |
| 2016/0096009 A1 | 4/2016 | Feld |
| 2016/0120647 A1 | 5/2016 | Rogers et al. |
| 2016/0206370 A1 | 7/2016 | Fruland et al. |
| 2016/0242894 A1 | 8/2016 | Davis |
| 2016/0302904 A1 | 10/2016 | Ogdahl et al. |
| 2016/0317180 A1 | 11/2016 | Kilemnik |
| 2016/0317304 A1 | 11/2016 | Spence et al. |
| 2017/0000598 A1 | 1/2017 | Bachar |
| 2017/0035410 A1 | 2/2017 | Catanese et al. |
| 2017/0128741 A1 | 5/2017 | Keltner et al. |
| 2017/0135830 A1 | 5/2017 | Harkin et al. |
| 2017/0156723 A1 | 6/2017 | Keating et al. |
| 2018/0103945 A1 | 4/2018 | Ciulla et al. |
| 2018/0146964 A1 | 5/2018 | Garcia et al. |
| 2018/0318114 A1 | 11/2018 | Huang et al. |
| 2018/0353169 A1 | 12/2018 | Amson et al. |
| 2018/0353181 A1 | 12/2018 | Wei |
| 2019/0125334 A1 | 5/2019 | Tong et al. |
| 2020/0022692 A1 | 1/2020 | Amson et al. |
| 2020/0038213 A1 | 2/2020 | Bly et al. |
| 2020/0121442 A1 | 4/2020 | Askeland |
| 2020/0187931 A1 | 6/2020 | Lamson et al. |
| 2021/0145619 A1 | 5/2021 | Bly et al. |
| 2021/0161641 A1 | 6/2021 | Bachar |
| 2021/0161642 A1 | 6/2021 | Jen et al. |
| 2021/0307641 A1 | 10/2021 | Rumbles et al. |
| 2021/0378659 A1 | 12/2021 | Lamson et al. |
| 2022/0000445 A1 | 1/2022 | Datta et al. |
| 2022/0031357 A1 | 2/2022 | Cutts et al. |
| 2022/0031358 A1 | 2/2022 | Yarra et al. |
| 2022/0031389 A1 | 2/2022 | Fischell et al. |
| 2022/0061834 A1 | 3/2022 | Chung et al. |
| 2022/0125499 A1 | 4/2022 | Hoey et al. |
| 2022/0133462 A1 | 5/2022 | Kilemnik |
| 2022/0142464 A1 | 5/2022 | Petroff et al. |
| 2022/0240921 A1 | 8/2022 | Catanese et al. |
| 2022/0240925 A1 | 8/2022 | Epstein et al. |
| 2022/0249219 A1 | 8/2022 | Chung et al. |
| 2022/0265262 A1 | 8/2022 | Melsheimer |
| 2022/0273918 A1 | 9/2022 | Ghriallais et al. |
| 2022/0378577 A1 | 12/2022 | Anderson et al. |
| 2022/0395363 A1 | 12/2022 | Ghriallais et al. |
| 2023/0022482 A1 | 1/2023 | Dhavale |
| 2023/0200802 A1 | 6/2023 | Catanese, III |
| 2023/0225720 A1 | 7/2023 | Lamson et al. |
| 2023/0225851 A1 | 7/2023 | Lamson et al. |
| 2023/0293166 A1 | 9/2023 | Lamson et al. |

FOREIGN PATENT DOCUMENTS

| | | |
|---|---|---|
| CN | 101795641 A | 8/2010 |
| CN | 102112064 B | 6/2014 |
| CN | 105852938 A | 8/2016 |
| CN | 105919695 A | 9/2016 |
| CN | 109675177 A | 4/2019 |
| CN | 211156119 U | 8/2020 |
| CN | 112891032 A | 6/2021 |
| CN | 216221843 U | 4/2022 |
| DE | 10159470 A1 | 6/2003 |
| DE | 102019101987 A1 | 7/2020 |
| EP | 0246836 B1 | 12/1991 |
| EP | 0464480 A1 | 1/1992 |
| EP | 0274846 B1 | 2/1994 |
| EP | 0632999 A1 | 1/1995 |
| EP | 0667126 A1 | 8/1995 |
| EP | 1016377 A2 | 7/2000 |
| EP | 1482841 A1 | 12/2004 |
| EP | 1082941 B1 | 3/2005 |
| EP | 1185317 B1 | 5/2005 |
| EP | 1584295 A2 | 10/2005 |
| EP | 1006909 B1 | 1/2007 |
| EP | 1852071 A2 | 11/2007 |
| EP | 1584295 B1 | 2/2008 |
| EP | 1884198 A2 | 2/2008 |
| EP | 1884199 A1 | 2/2008 |
| EP | 1887976 A2 | 2/2008 |
| EP | 1670361 B1 | 4/2008 |
| EP | 1962720 B1 | 9/2008 |
| EP | 1331886 B1 | 12/2008 |
| EP | 1482840 B1 | 12/2008 |
| EP | 2111167 A1 | 10/2009 |
| EP | 2164427 B1 | 3/2010 |
| EP | 2243507 A1 | 10/2010 |
| EP | 1484023 B1 | 5/2011 |
| EP | 2339970 A2 | 7/2011 |
| EP | 2345373 A1 | 7/2011 |
| EP | 2345374 A1 | 7/2011 |
| EP | 2600781 A2 | 6/2013 |
| EP | 2658458 A2 | 11/2013 |
| EP | 2658477 A2 | 11/2013 |
| EP | 2049023 B1 | 12/2014 |
| EP | 2344048 B1 | 9/2016 |
| EP | 3167845 A1 | 5/2017 |
| FR | 2750031 A1 | 12/1997 |
| JP | 5836559 A | 3/1983 |
| JP | 09122134 | 5/1997 |
| JP | 2001137254 A | 5/2001 |
| JP | 3370300 B2 | 1/2003 |
| JP | 2004344427 A | 12/2004 |
| JP | 2009106755 A | 5/2009 |
| JP | 2009521278 A | 6/2009 |
| JP | 2011529745 A | 12/2011 |
| JP | 2012143622 A | 8/2012 |
| JP | 2023502729 A | 1/2023 |
| KR | 20060009698 A | 2/2006 |
| KR | 101554820 B1 | 7/2015 |
| RU | 2062121 C1 | 6/1996 |
| RU | 2112571 C1 | 6/1998 |
| RU | 2128012 C1 | 3/1999 |

(56) References Cited

FOREIGN PATENT DOCUMENTS

| | | |
|---|---|---|
| RU | 2221501 C2 | 1/2004 |
| WO | 1987001270 A1 | 3/1987 |
| WO | 1991008708 A1 | 6/1991 |
| WO | 1992010142 A1 | 6/1992 |
| WO | 1993004727 A1 | 3/1993 |
| WO | 1993015664 A1 | 8/1993 |
| WO | 1994026170 A1 | 11/1994 |
| WO | 1995000818 A1 | 1/1995 |
| WO | 2000040159 A1 | 7/2000 |
| WO | 2001026588 A2 | 4/2001 |
| WO | 2001028432 A1 | 4/2001 |
| WO | 2001039671 A1 | 6/2001 |
| WO | 2001049195 A1 | 7/2001 |
| WO | 2001065997 A2 | 9/2001 |
| WO | 2001095818 A1 | 12/2001 |
| WO | 2002028289 A1 | 4/2002 |
| WO | 2002030335 A2 | 4/2002 |
| WO | 2002032321 A1 | 4/2002 |
| WO | 2002058577 A1 | 8/2002 |
| WO | 2003039334 A2 | 5/2003 |
| WO | 2003077772 A1 | 9/2003 |
| WO | 2004000159 A2 | 12/2003 |
| WO | 2004017845 A1 | 3/2004 |
| WO | 2004019787 A2 | 3/2004 |
| WO | 2004019788 A2 | 3/2004 |
| WO | 2004030569 A2 | 4/2004 |
| WO | 2004066875 A1 | 8/2004 |
| WO | 2004080529 A2 | 9/2004 |
| WO | 2004103189 A1 | 12/2004 |
| WO | 2005034738 A2 | 4/2005 |
| WO | 2005065412 A2 | 7/2005 |
| WO | 2005094447 A2 | 10/2005 |
| WO | 2006127241 A2 | 11/2006 |
| WO | 2006127431 A2 | 11/2006 |
| WO | 2007048437 A1 | 5/2007 |
| WO | 2007053516 A2 | 5/2007 |
| WO | 2007064906 A2 | 6/2007 |
| WO | 2007075981 A2 | 7/2007 |
| WO | 2008002340 A2 | 1/2008 |
| WO | 2008006084 A2 | 1/2008 |
| WO | 2008014191 A2 | 1/2008 |
| WO | 2008043044 A2 | 4/2008 |
| WO | 2008043917 A2 | 4/2008 |
| WO | 2008097942 A1 | 8/2008 |
| WO | 2008132735 A1 | 11/2008 |
| WO | 2008142677 A2 | 11/2008 |
| WO | 2009009617 A1 | 1/2009 |
| WO | 2009072131 A2 | 6/2009 |
| WO | 2009135005 A1 | 11/2009 |
| WO | 2010011832 A1 | 1/2010 |
| WO | 2010014821 A2 | 2/2010 |
| WO | 2010014825 A1 | 2/2010 |
| WO | 2010065214 A2 | 6/2010 |
| WO | 2010086849 A1 | 8/2010 |
| WO | 2010106543 A2 | 9/2010 |
| WO | 2011084712 A1 | 7/2011 |
| WO | 2012018446 A2 | 2/2012 |
| WO | 2012028843 A1 | 3/2012 |
| WO | 2012079548 A1 | 6/2012 |
| WO | 2012079549 A2 | 6/2012 |
| WO | 2012091952 A2 | 7/2012 |
| WO | 2012091954 A2 | 7/2012 |
| WO | 2012091955 A2 | 7/2012 |
| WO | 2012091956 A2 | 7/2012 |
| WO | 2012123950 A2 | 9/2012 |
| WO | 2014003987 A1 | 1/2014 |
| WO | 2014035506 A2 | 3/2014 |
| WO | 2014145381 A2 | 9/2014 |
| WO | 2014153219 A1 | 9/2014 |
| WO | 2014200764 A1 | 12/2014 |
| WO | 2015006729 A2 | 1/2015 |
| WO | 2015101975 A1 | 7/2015 |
| WO | 2016134166 A1 | 8/2016 |
| WO | 2017017499 A1 | 2/2017 |
| WO | 2017081326 A2 | 5/2017 |
| WO | 2017112856 A1 | 6/2017 |
| WO | 2018027145 A1 | 2/2018 |
| WO | 2021190092 A1 | 9/2021 |

OTHER PUBLICATIONS

Bacharova, O.A., et al. "The Effect of Rhodiolae rosea Extract on Incidence Rate of Superficial Bladder Carcinoma Relapses", Kozin 1995.
Berges, Richard, et al. "Alternative Minimalinvasive Therapien Beim Benignen Prostatasyndrom", Medizin, Jg. 104, Heft 37, Sep. 14, 2007.
Borzhievski, et al., "Tactics of the Surgical Treatment of Patients With Prostatic Adenoma and Acute Urinary Retention," Urologia Nefrol (Mosk), Jan.-Feb. 1987, (1):39-43.
European Search Report for EP Application No. 06770621.8, mailed Sep. 20, 2012.
European Search Report for EP Application No. 06845991.6, mailed on Mar. 22, 2013.
European Search Report for EP Application No. 07840462.1, mailed May 29, 2012.
European Search Report for EP Application No. 08729001.1, mailed on Feb. 4, 2014.
European Search Report for EP Application No. 08772483.7, mailed on Feb. 12, 2015.
European Search Report for EP Application No. 11154962.2, mailed on May 19, 2011.
European Search Report for EP Application No. 11154976.2, mailed on Jun. 6, 2011.
European Search Report for EP Application No. 11814950.9, mailed on Sept. 8, 2015.
European Search Report for EP Application No. 11852778.7, mailed on Nov. 19, 2015.
European Search Report for EP Application No. 11854148.1, mailed on Oct. 20, 2017.
European Search Report for EP Application No. 13810314.8, mailed on Apr. 6, 2016.
European Search Report for EP Application No. 17150545.6, mailed on Sep. 11, 2017.
Extended European Search Report mailed Jan. 20, 2020 in EP Patent Application No. 19199026.6.
Hartung, Rudolf, et al. "Instrumentelle Therapie der benignen Prostatahyperplasie", Medizin, Deutsches Arzteblatt 97, Heft 15, Apr. 14, 2000.
Hofner, Klaus, et al., "Operative Therapie des benignen Prostatasyndroms", Medizin, Dtsch Arztebl, 2007; 104(36): A 2424-9.
Hubmann, R. "Geschichte der transurethralen Prostataeingriffe", Geschichte der Medizin, Urologe [B], 2000, 40:152-160.
International Search Report for PCT Application No. PCT/US2006/019372, mailed on May 2, 2008.
International Search Report for PCT Application No. PCT/US2006/048962, mailed Dec. 10, 2008.
International Search Report for PCT Application No. PCT/US2007/074019, mailed on Jul. 25, 2008.
International Search Report for PCT Application No. PCT/US2008/053001, mailed on Jun. 17, 2008.
International Search Report for PCT Application No. PCT/US2008/069560, mailed on Sep. 8, 2008.
International Search Report for PCT Application No. PCT/US2009/052271, mailed on Apr. 7, 2010.
International Search Report for PCT Application No. PCT/US2009/052275, mailed on Oct. 9, 2009.
International Search Report for PCT Application No. PCT/US2011/041200, mailed on Feb. 17, 2012.
International Search Report for PCT Application No. PCT/US2011/065348, mailed on Jun. 21, 2012.
International Search Report for PCT Application No. PCT/US2011/065358, mailed on Jun. 21, 2012.
International Search Report for PCT Application No. PCT/US2011/065377, mailed on Aug. 29, 2012.

(56) References Cited

OTHER PUBLICATIONS

International Search Report for PCT Application No. PCT/US2011/065386, mailed on Jun. 28, 2012.
International Search Report for PCT Application No. PCT/US2013/044035, mailed on Sept. 6, 2013.
Jonas, U., et al., "Benigne Prostatahyperplasie", Der Urologe 2006—[Sonderheft] 45:134-144.
Keehn, Aryeh, et al. "UroLift in Place of Fiduciary Markers for Patients With Benign Prostatic Hyperplasia Undergoing External Beam Radiation Therapy," Urology, vol. 104; pp. 230-234 (2017).
Kruck, S., et al., "Aktuelle Therapiemoglichkeiten des Benignen Prostata-Syndroms", J Urol Urogynakol, 2009; 16 (1): 19-22.
Ng, Michael et al. "Fiduciary markers and spacers in prostate radiotherapy: current applications," BJU International, vol. 113, supplement 2; pp. 13-20 (2014).
PCT International Search Report mailed Feb. 10, 2020 in PCT application No. PCT/US2019/058708 filed Oct. 30, 2019.
PCT Written Opinion mailed Feb. 10, 2020 in PCT application No. PCT/US2019/058708 filed Oct. 30, 2019.
Reich, O., et al., "Benignes Prostatasyndrom (BPS)," Der Urologe A Issue vol. 45, No. 6, Jun. 2006, p. 769-782.
Schauer, P., et al. "New applications for endoscopy: the emerging field of endoluminal and transgastric bariatric surgery", Surgical Endoscopy, (Apr. 24, 2006), 10 pgs.
Sharp, Howard T., M.D., et al. "Instruments and Methods—The 4-S Modification of the Roeder Knot: How to Tie It", Obstetrics & Gynecology, p. 1004-1006, vol. 90, No. 6, Dec. 1997.
Trapeznikov, et al., "New Technologies in the Treatment of Benign Prostatic Hyperplasia", Urologia Nefrol (Mosk), Jul.-Aug. 1996, (4):41-47.
Yeung, Jeff. "Treating Urinary Stress Incontenance Without Incision with Endoscopic Suture Anchor & Approximating Device," Aleeva Medical, Inc., 2007.

\* cited by examiner

SYSTEM FOR DELIVERY OF A FIDUCIAL MARKER

CROSS REFERENCE TO RELATED APPLICATIONS

This application is a U.S. national stage application under 35 U.S.C. 371 of PCT Application No. PCT/US2019/058708, entitled "SYSTEM FOR DELIVERY OF A FIDUCIAL MARKER" and filed Oct. 30, 2019, which claims priority to U.S. provisional patent application No. 62/756,907, entitled "DEVICE AND SYSTEM FOR DELIVERY OF FIDUCIAL MARKERS" and filed on Nov. 7, 2018, each of which is herein incorporated by reference in its entirety.

BACKGROUND OF THE INVENTION

The present invention relates generally to medical devices, and more particularly to systems for delivering fiducial markers to an interventional site within the body of a human or animal subject.

Prostate cancer is the second most common cancer, as well as the second leading cause of cancer-related deaths, among men in the United States. Presently, one in nine men in the United States is diagnosed with prostate cancer in their lifetime. The American Cancer Society estimates about 165,000 new cases of prostate cancer and 29,000 deaths from prostate cancer will occur in 2018.

External Beam Radiation Therapy (EBRT) is a core treatment modality for patients with non-metastatic prostate cancer and is used for nearly one third of all patients receiving prostate cancer therapy.

Three-dimensional (3D) conformal radiation therapy (3DCRT) is an individualized, image-guided EBRT technique whereby a radiation dose is planned and delivered such that the high-dose volume is restricted to a predetermined target volume. 3DCRT utilizes 3D digital data sets representative of patient tumors and adjacent anatomy. These data sets are then used to select the number, direction, and arrangement of radiation beams to deliver the high-dose radiation to a volume of tissue. This targeting process allows higher doses of radiation to be delivered to cancer cells while reducing the amount of off-target radiation received by adjacent, healthy tissue. Accordingly, effective delivery of conformal radiation therapy (RT) relies on accurately locating the prostate gland and its boundaries.

Fiducial markers, small radiopaque objects typically made from gold or platinum, can be implanted in the prostate gland prior to RT and subsequently used to localize the prostate gland and associated tumor and to accurately deliver the radiation dose during treatment. Fiducial markers known in the prior art are designed to be biologically inert. Fiducial markers are typically delivered using a needle applicator, whose length can range from 20 cm to 30 cm. Ideally, fiducial markers are implanted 3 mm to 5 mm from the edge of the prostate gland, which is covered by a tissue capsule.

Fiducial markers are typically implanted using a transrectal or transperineal approach. In both approaches, the fiducials are implanted from a few days to a week before the initial scans that are then used to plan the radiation treatment. The transrectal procedure carries with it a risk of rectal bleeding and both procedures carry the risk of infection, and of urosepsis in particular. Other complications of fiducial marker placement include pain, fever, voiding issues, hematuria, hematospermia, inflammatory bowel disease, and complications related to migration of the markers.

Patients with prostate cancer frequently experience lower urinary tract symptoms (LUTS) including urinary hesitancy, chronic urinary retention, and nocturia. Furthermore, patients undergoing EBRT are more likely to experience LUTS, particularly if the patient also suffers from Benign Prostatic Hyperplasia (BPH), a condition characterized by noncancerous enlargement of the prostate.

BPH can be treated by a variety of surgical and nonsurgical procedures including a minimally invasive transurethral procedure that implants small prostatic anchors to hold the prostate lobes in compression and relieve blockage of the urethra.

Such a system could also be used to deliver fiducial markers for EBRT as the placement of the anchors can be used to delineate the prostate during the planning and execution of RT. In this way, fiducial markers could be implanted without the need for an additional procedure and/or in a way that identifies the boundary of the prostate. Embodiments of the invention disclosed herein address various aspects of such as system and the methods of use of that system.

SUMMARY OF THE INVENTION

Embodiments of the present invention are directed towards a system for transurethral delivery of fiducial markers to the prostate gland that can be used to visualize and target the prostate during radiation therapy. One embodiment of the system includes a device having at least one fiducial marker, an anchor assembly with a first and second anchoring component and a connector, and a delivery device.

The fiducial markers can be made of materials that are detectable by suitable medical imaging equipment. The fiducial markers can be formed integrally with or are attached to various portions of the anchor assembly by swaging, molding, plating, or embedding during formation of the anchor assembly.

In some embodiments, the fiducial marker is a dye or contrast agent deposited on the connector or delivered by a needle advanceable from the fiducial delivery device. The needle can be used to inject or release the dye or contrast agent into the prostatic lobes or extra-prostatic space.

Various embodiments of the anchor assembly with fiducial markers are disclosed and described herein. Moreover, various ways in which fiducial markers can be deposited to an interventional site by the fiducial delivery device independent of the anchor assembly are discussed.

Other features and advantages of embodiments of the present invention will become apparent from the following description, taken in conjunction with the accompanying drawings, which illustrate, by way of example, certain principles of the invention.

DETAILED DESCRIPTION OF ILLUSTRATIVE EMBODIMENTS

The present disclosure is directed to a system for transurethral delivery of fiducial markers to the prostate that can be used to visualize and target the prostate during radiation therapy. The figures herein are provided by way of example and not limitation, and the description of the various embodiments of the invention includes all aspects of the figures.

Generally, embodiments of the system according to the present disclosure include an anchor assembly that modifies, contours, or otherwise manipulates prostatic tissue and includes material or one or more features detectable by medical targeting and/or imaging modalities. Such modalities presently include, but are not limited to, ultrasound, magnetic resonance imaging (MRI), and radiography (such as x-ray imaging and including computed tomography). For radiography, the suitable materials are radiopaque and include, but are not limited to, gold, platinum, or tantalum. To the extent an embodiment refers to a fiducial marker as being radiopaque, it should be understood that fiducial markers having properties detectable by other medical targeting and/or imaging modalities are also included in such an embodiment. Further, the shape, size, and surface texture (including roughness) of an anchor assemble can be altered improve the ability for targeting and/or imaging modalities to detect the anchor assembly.

Figure 1:
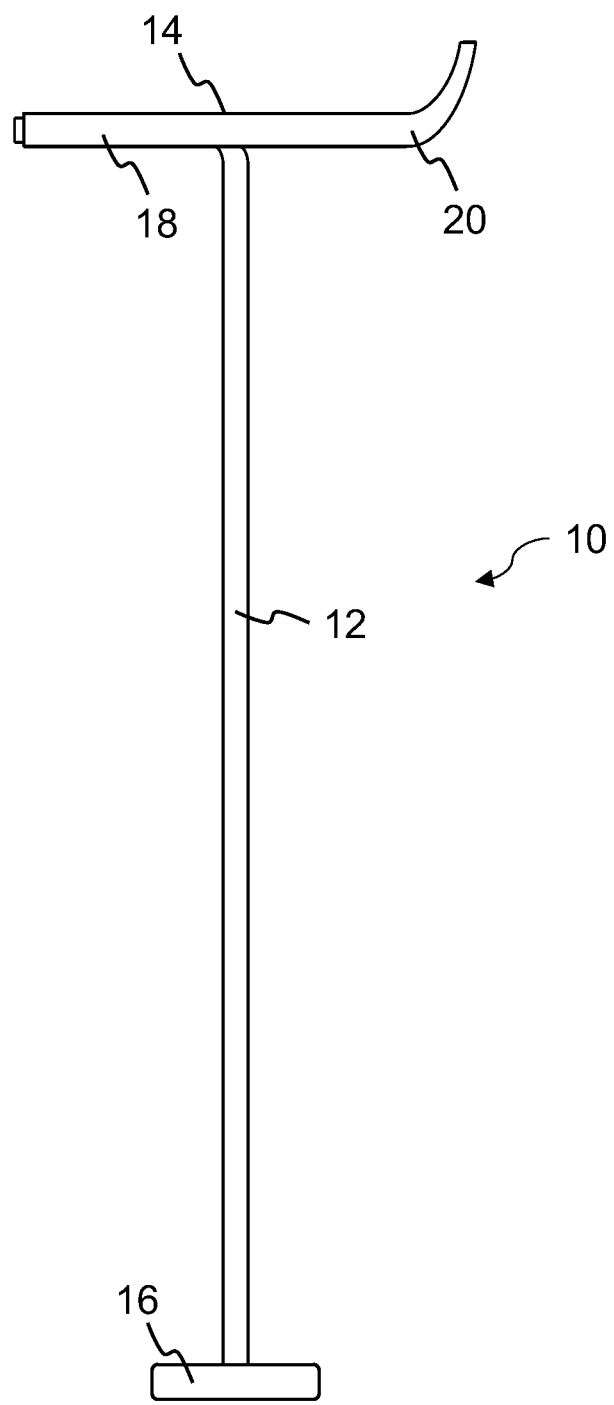
FIG. 1 is a top view of an assembled anchor assembly.

FIG. 1 is a top view of an assembled anchor assembly. As shown in FIG. 1, implant or anchor assembly 10 includes connector 12 situated between first anchoring component 14 and second anchoring component 16. Connector 12 can be formed from suitable material that provides a desired holding force between the first and second anchoring components. In some embodiments, connector 12 can be formed from conventional suture material. In preferred embodiments, connector 12 is monofilament polyethylene terephthalate (PET). The flexible material of connector 12 can accommodate access and placement of anchor assembly 10 to various positions in the prostate and transmit necessary forces between the first and second anchoring components. First anchoring component 14 can be attached to connector 12 by various means including, but not limited to, adhesive bonding or thermal bonding or can include tabs or other structures capable of forming a locking arrangement with connector 12. Alternatively, first anchoring component 14 can be crimped or secured directly to connector 12. In some embodiments, connector 12 includes a structure(s) which is complementary to first anchoring component 14 to facilitate attachment.

Similar approaches can be used to secure connector 12 to second anchoring component 16. However, in preferred embodiments, second anchoring component is secured to connector 12 during the time of placement of anchor assembly 10 within a patient. That is, in preferred embodiments, first anchoring component 14 can be attached to connector 12 during the manufacturing process, and second anchoring component is left unsecured to connector 12. An unassembled anchor assembly is loaded into a delivery system. First anchoring component 14 and attached connector 12 are delivered to a location within or near the prostate gland. Second anchoring component 16 is then secured to connector 12 by the delivery system within or near the prostate gland.

Various embodiments of an anchor assembly or selected portions thereof and an anchor assembly delivery device are detailed or contemplated in U.S. Pat. No. 7,896,891 entitled "Apparatus and Method for Manipulating or Retracting Tissue and Anatomical Structure" and U.S. Pat. No. 7,914,542 entitled "Devices, Systems and Methods for Treating Benign Prostatic Hyperplasia and Other Conditions" which are hereby incorporated by reference in their entireties.

First anchoring component 14 and second anchoring component 16 can be formed from conventional biocompatible materials such as, but not limited to, stainless steel and nitinol. First anchoring component 14 includes a first portion 18 and a second portion 20. In some preferred embodiments, first portion 18 is a generally cylindrical structure while second portion 20 is at least partially cylindrical and includes a curved, angled, or otherwise bent structure or leg.

The lumen within the generally cylindrical portion of first anchoring component 14 can facilitate attachment of connector 12 by placing connector 12 coaxially within the lumen of the generally cylindrical portion of first anchoring component 14. Once connector 12 is within the lumen of the generally cylindrical portion of first anchoring component 14, connector 12 can be secured via various means including, but not limited to, adhesive bonding or thermal bonding. First anchoring component 14 can include tabs or other structures capable of forming a locking arrangement with connector 12.

In one preferred embodiment, the process for attaching first anchoring component 14 and connector 12 can include creating a fiducial marker at or near the junction of first anchoring component 14 and connector 12. In the case of bonding connector 12 to first anchoring component 14, the bonding process can introduce a fiducial marker material. For example, a radiopaque adhesive material can be used to bond first anchoring component 14 and connector 12. A radiopaque foil, sheet, or other thin structure can be used to form an interference fit between first anchoring component 14 and connector 12 by sandwiching the foil between first anchoring component 14 and connector 12. A radiopaque cap, plug, or similar structure can be used to anchor the end of connector 12 to first anchoring component.

Still further, a radiopaque material can be introduced during a thermal bonding step to bond first anchoring component 14 and connector 12. For example, when connector 12 is within the lumen of the generally cylindrical portion of first anchoring component 14, a fiducial marker can be embedded at or near the joint between first anchoring component 14 and connector 12 by heating the joint and introducing the fiducial marker. The heating step can be used form a cap on a portion of connector 12 that extends outside the the lumen of the generally cylindrical portion of first anchoring component 14, thereby forming a secure connection between first anchoring component 14 and connector 12. This cap could contain a fiducial marker.

While one embodiment of anchor assembly 10 is illustrated in FIG. 1 with a single first anchoring component 14, in other embodiments, an anchor assembly can include a plurality of first anchoring components spaced to suit a particular application. When a plurality of first anchoring components are included, the first anchoring components can be spaced at time of deployment, or can be spaced after deployment with subsequent manipulation. The first anchoring components can be provided at fixed, spaced positions, or can be provided such that the first anchoring components are able to be moved into the desired spaced arrangement.

Figure 2:
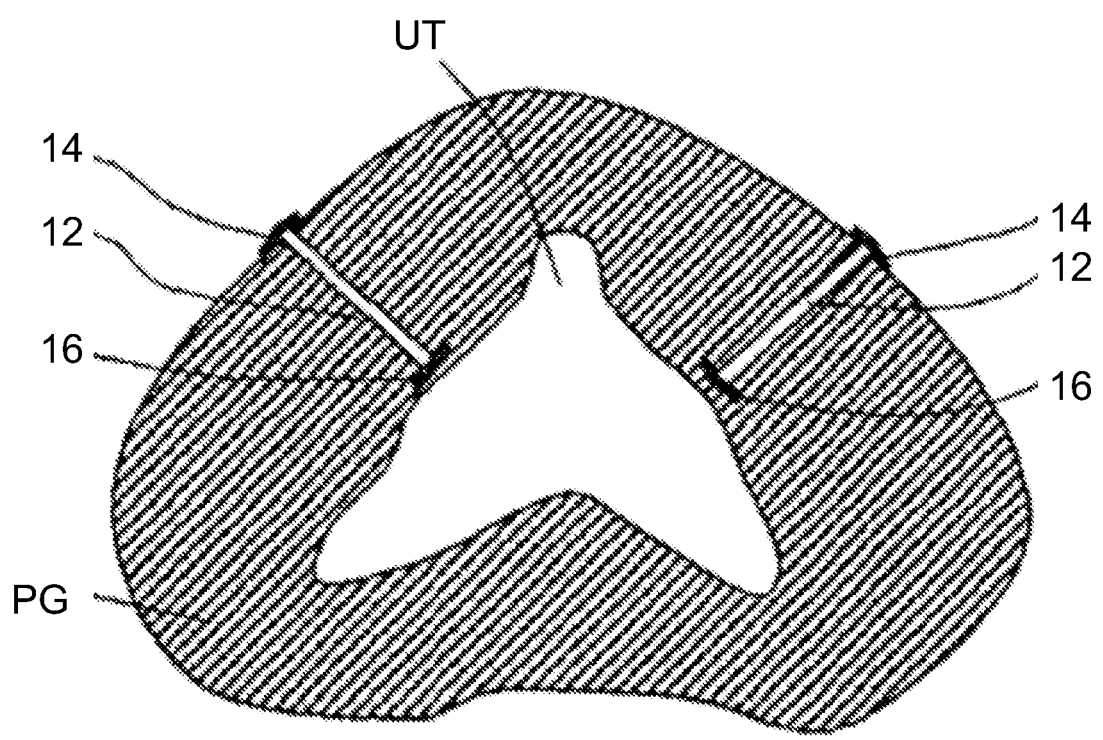
FIG. 2 is a cross-sectional view through the prostatic urethra with the anchor assembly applied to the prostate.

FIG. 2 is a cross-sectional view through the prostatic urethra (the portion of the urethra that passes through the prostate gland) with the anchor assembly applied to the prostate. As shown in FIG. 2, an anchor assembly can be employed to manipulate the prostate gland (PG) by positioning first anchoring component 14 at the outer surface of the prostatic capsule and second anchoring component 16 at or near the inner surface of the urethra (UT) such that the tissue captured between the anchors is held in a compressed state by tensioned connector 12. While a single anchor assembly is shown on each lateral lobe of FIG. 2, it will be understood that multiple anchor assemblies can be applied to each lateral lobe depending on the application. The length of the connector element can also be customized for various applications.

In preferred embodiments, the anchor assembly is part of a transurethral system that localizes fiducial markers to the prostate for the purpose of marking and/or delineating the prostate, or a portion thereof, during x-ray imaging, MRI, CT scan, and/or radiotherapy. This can be achieved by incorporating or connecting plates, bands, or seeds of markers made of inert, radiopaque material such as, but not limited to, gold, platinum, or tantalum to various portions of the anchor assembly during manufacture or formation of the anchor assembly.

Markers can be various shapes and sizes. In some preferred embodiments, markers are spherical or cylindrical in shape with a diameter in the range of 0.5-1.5 mm and a length in the range of 2-5 mm that are easily identified during targeting and/or imaging.

In some embodiments, radiopaque markers (subsequently referred to as "markers") are incorporated by swaging, molding, plating, or embedding radiopaque material onto a portion of the anchor assembly. In preferred embodiments, at least three markers are used during the procedure to establish the required number of fiducial targets. More than one marker can be present on an anchor component, connector, or anchor assembly. To the extent the markers are included on the connector, the number of markers should be such that the flexibility of the connector is maintained.

Figure 3A:
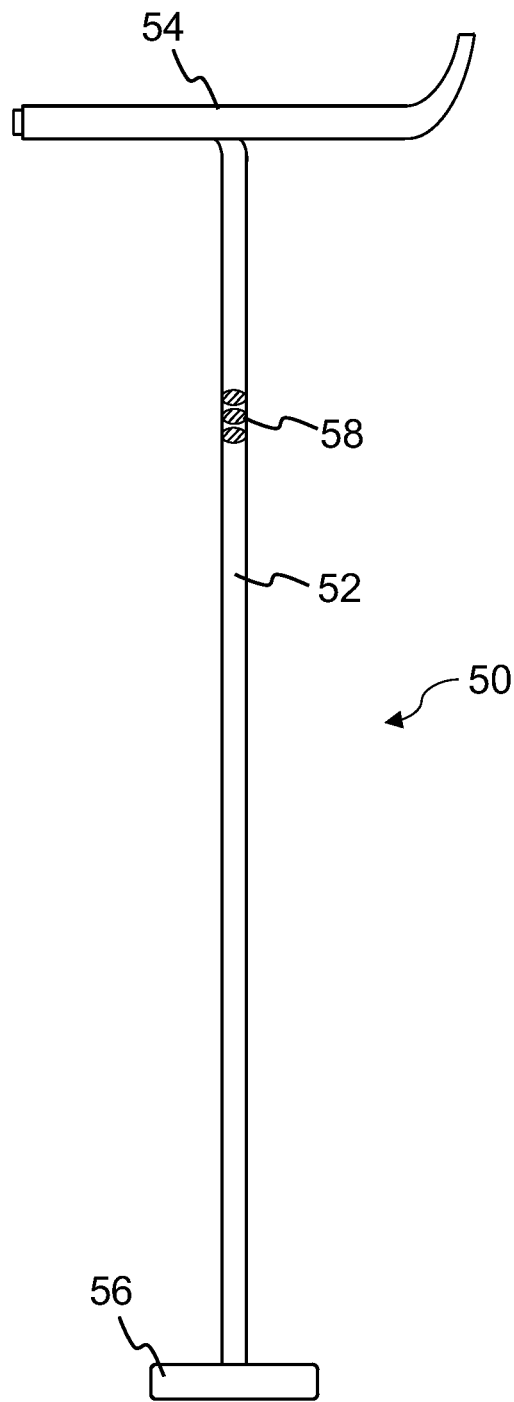
FIG. 3A is a top view of one embodiment of an anchor assembly with fiducial marker(s).
Figure 3B:
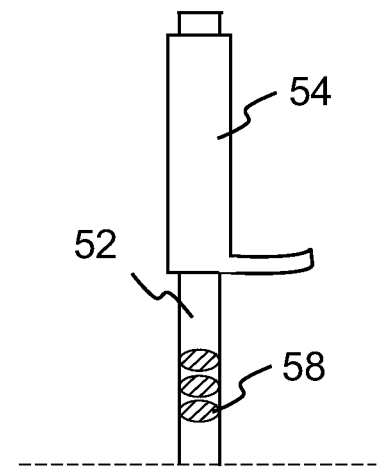
FIG. 3B is an enlarged, top view of one embodiment of an anchor assembly with fiducial marker(s).
Figure 3C:
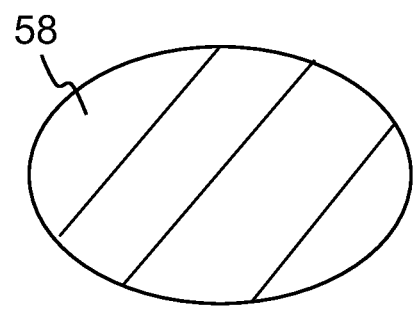
FIG. 3C is an enlarged, top view of one embodiment of a fiducial marker.

FIG. 3A is a top view of one embodiment of an anchor assembly with fiducial marker(s). FIG. 3B is an enlarged, top view of one embodiment of an anchor assembly with fiducial marker(s). As shown in FIGS. 3A-3B, anchor assembly 50 includes connector 52 with markers 58. Markers can be clustered together and biased toward the end of connector 52 that contacts first anchoring component 54 or second anchoring component 56. Alternatively, markers 58 can be spaced at equidistant intervals along the length of connector 52.

Figures 4A, 4B, 4C:
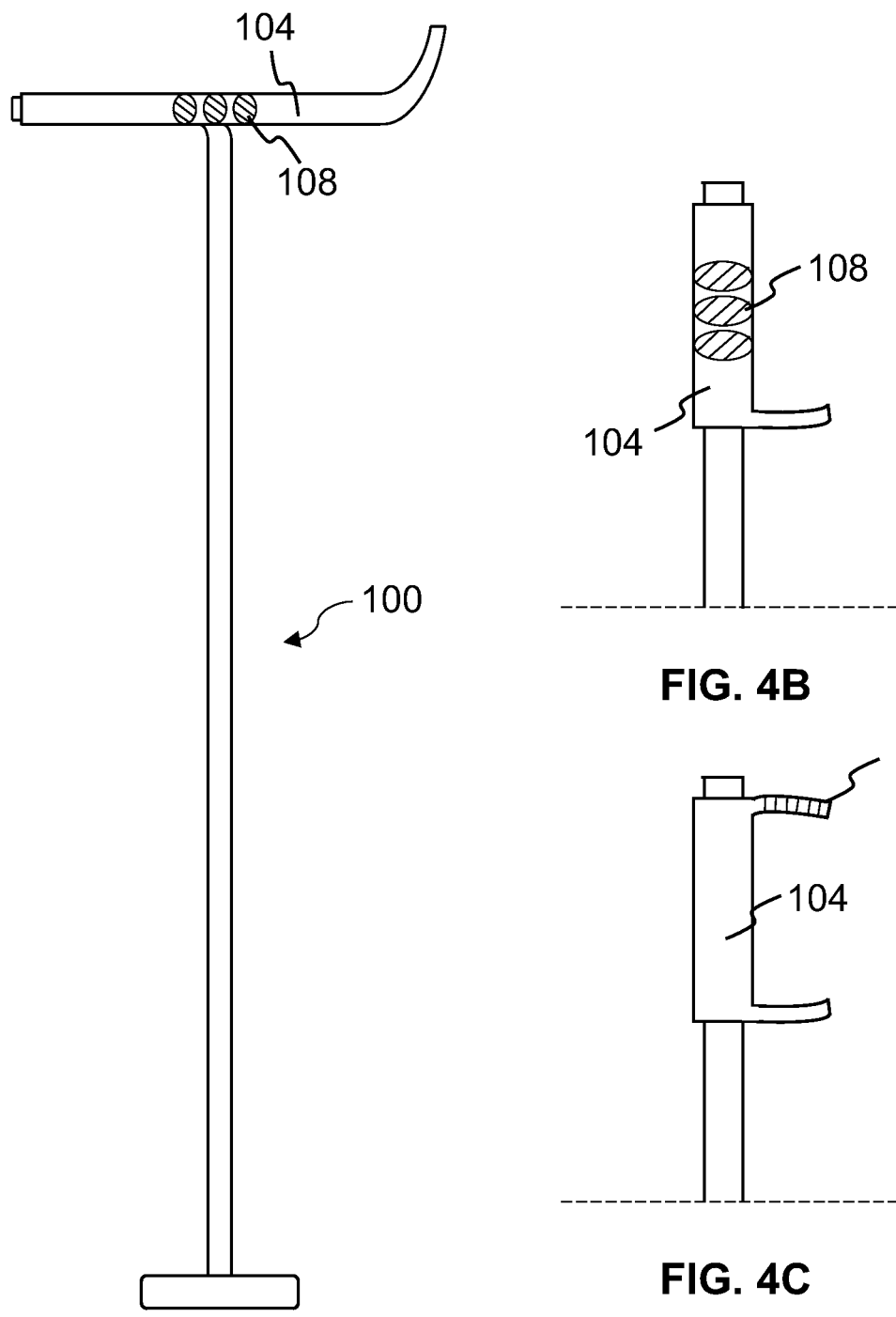
FIG. 4A is a top view of another embodiment of an anchor assembly with fiducial marker(s).
FIG. 4B is an enlarged, top view of another embodiment of an anchor assembly with fiducial marker(s).
FIG. 4C is an enlarged, top view of another illustrative embodiment of an anchoring component with fiducial marker(s).
Figure 5:
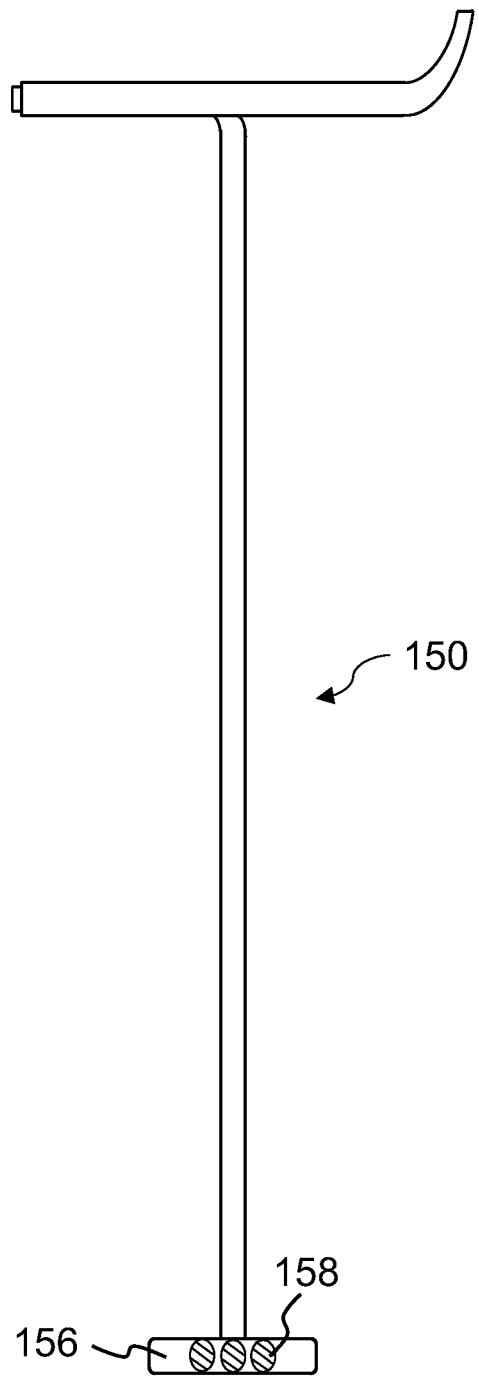
FIG. 5 is a top view of an embodiment of an anchor assembly with fiducial marker(s).

In other embodiments, radiopaque markers can be included in the anchoring portions of the anchor assembly. FIG. 4A is a top view of another embodiment of an anchor assembly with fiducial marker(s). FIG. 4B is an enlarged, top view of another embodiment of an anchor assembly with fiducial marker(s). FIG. 4C is an enlarged, top view of another illustrative embodiment of an anchoring component with fiducial marker(s). FIGS. 4A and 4B illustrate anchor assembly 100 with a plurality of markers 108 incorporated in first anchoring component 104. Alternatively, as shown in FIG. 4C, anchor assembly 100 can include an anchoring component 104 with a second radiopaque leg 120 in lieu of or in addition to markers 108. FIG. 5 is a top view of an embodiment of an anchor assembly with fiducial marker(s). FIG. 5 illustrates anchor assembly 150 with a plurality of markers 158 in second anchoring component 156. It is also contemplated that the first and second anchoring components or portions thereof can be manufactured from radiopaque material or include coils, anchors, or other suitable structures that confer the ability of the anchor assembly to manipulate the prostate and function as fiducial markers.

Figure 6:
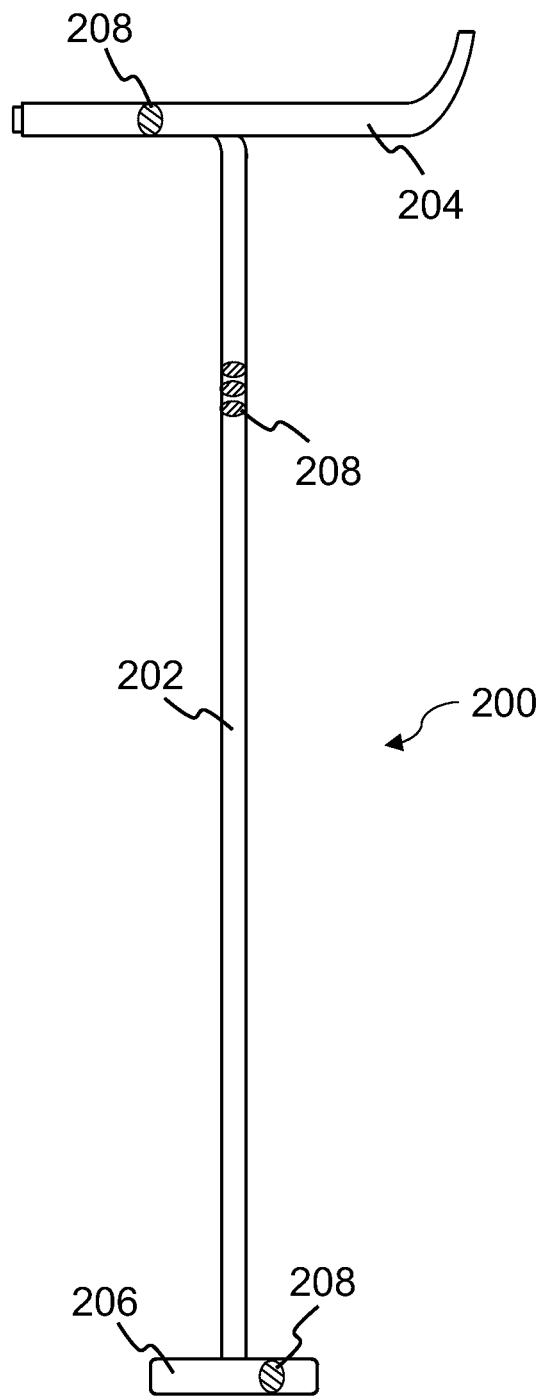
FIG. 6 is a top view of an embodiment of an anchor assembly with fiducial marker(s).

FIG. 6 is a top view of an embodiment of an anchor assembly with fiducial marker(s). FIG. 6 shows an embodiment of anchor assembly 200 in which markers 208 are included in first anchoring component 204, connector 202, and/or second anchoring component 206. Use of markers 208 on the first and/or second anchoring components, in addition to the markers on connector 202, can allow for additional positional information of the prostate to be obtained and further refine the boundaries of the prostate when during imaging and/or radiotherapy.

In some embodiments, rather than using distinct fiducial markers, the connector or suture can be coated, filled, or saturated with radiopaque dye or contrast agent such as barium sulfate. It is contemplated that the anchoring components of the anchor assembly can also be configured with reservoirs filled with radiopaque dye or contrast agent.

Alternatively, co-delivery of the radiopaque dye or contrast agent could be achieved by including an internal reservoir filled with radiopaque dye or contrast agent housed in the delivery device such that when the anchor assembly is advanced from the device, it picks up a desired quantity of the dye or agent.

Figures 7A, 7B:
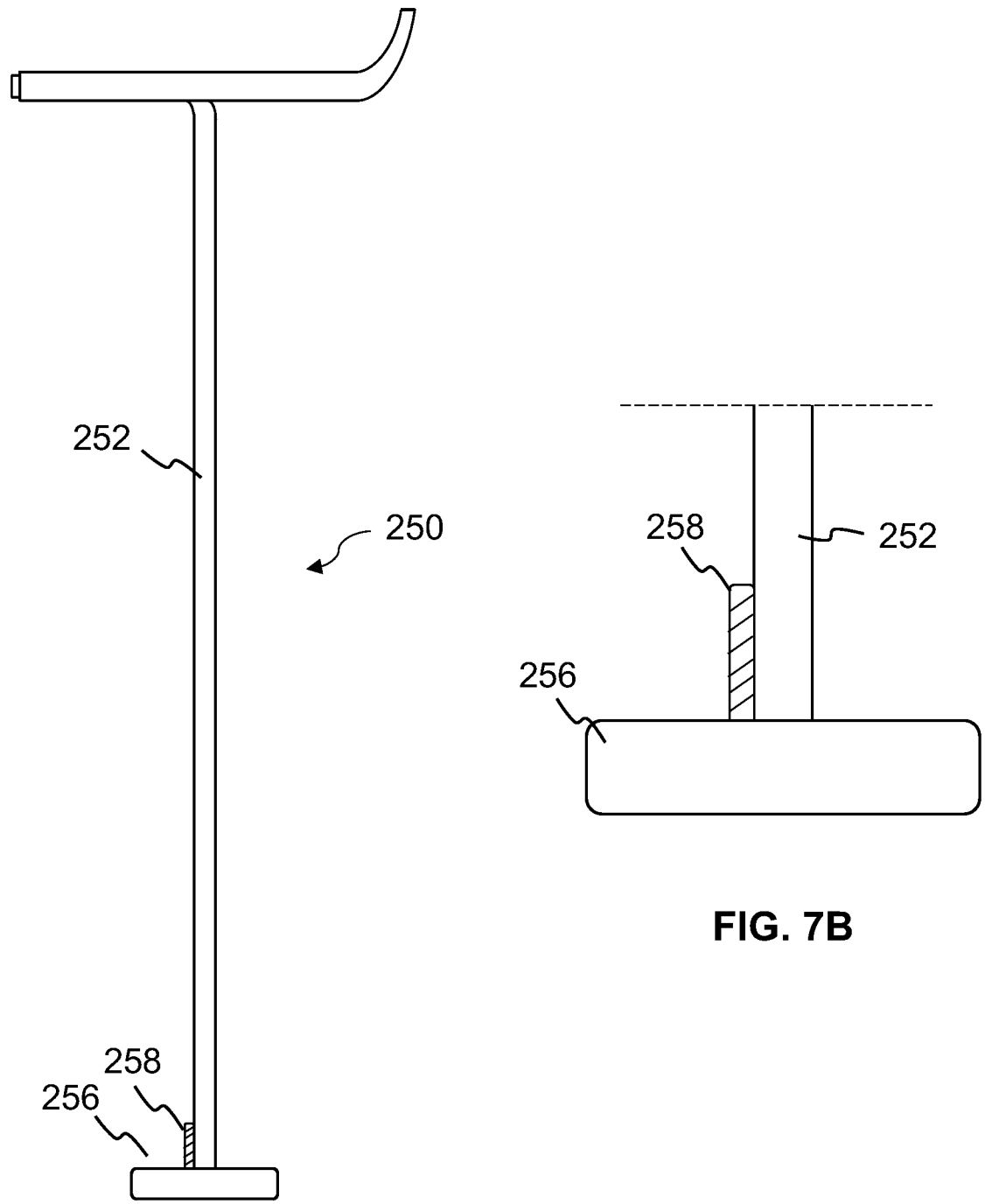
FIG. 7A is a top view of an embodiment of an anchor assembly with a fiducial tag.
FIG. 7B is an enlarged, top view of an embodiment of an anchor assembly with a fiducial tag.

FIG. 7A is a top view of an embodiment of an anchor assembly with a fiducial tag. FIG. 7B is an enlarged, top view of an embodiment of an anchor assembly with a fiducial tag. In FIGS. 7And 7B, rather than swaging a radiopaque marker onto a component of the anchor assembly, an embodiment with a separate radiopaque tag is shown. Here, radiopaque tag 258 is a thin sheet of radiopaque material situated between second anchoring component 256 and connector 252. Tag 258 can be attached to second anchoring component 256 and connector 252 by conventional means.

In embodiments of the anchor assembly in which a plurality of markers are used, each marker can have the same dimensions and thickness or be of varying dimensions and thicknesses. Varying the thickness of radiopaque markers can provide directionality or orientation-related information of the prostate.

Figures 8A, 8B:
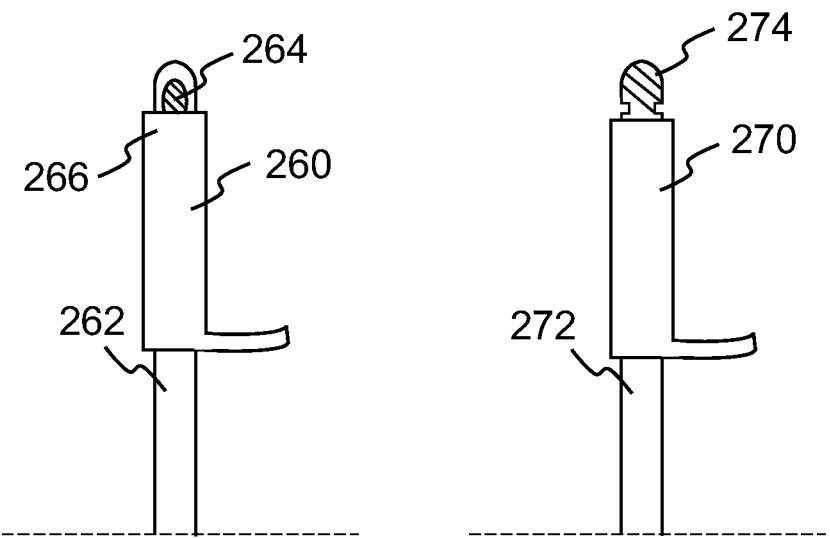
FIG. 8A is a top view of another illustrative embodiment of a connector with a fiducial marker.
FIG. 8B is a top view of another illustrative embodiment of an anchoring component with a fiducial marker.

Alternative embodiments of anchor assemblies incorporating radiopaque material are shown in FIGS. 8A and 8B. FIG. 8A is a top view of another illustrative embodiment of a connector with a fiducial marker. FIG. 8B is a top view of another illustrative embodiment of an anchoring component with a fiducial marker. FIG. 8A shows connector 262 in which radiopaque marker 264 has been incorporated into a rounded tip of the connector that extends beyond cylindrical end 266 of first anchoring component 260. This allows marker 264 to be situated in the extra-prostatic space when the anchor assembly is implanted and prevents or minimizes the creation of imaging artifacts. Markers may be placed in the intra-prostatic space in order to localize specific features within the prostate. FIG. 8B shows a partial view of an anchor assembly that includes bullet tip 274 made of radiopaque material. Tip 274 can be secured to the end of first anchoring component 270 or configured to be continuous with connector 272.

Figure 9:
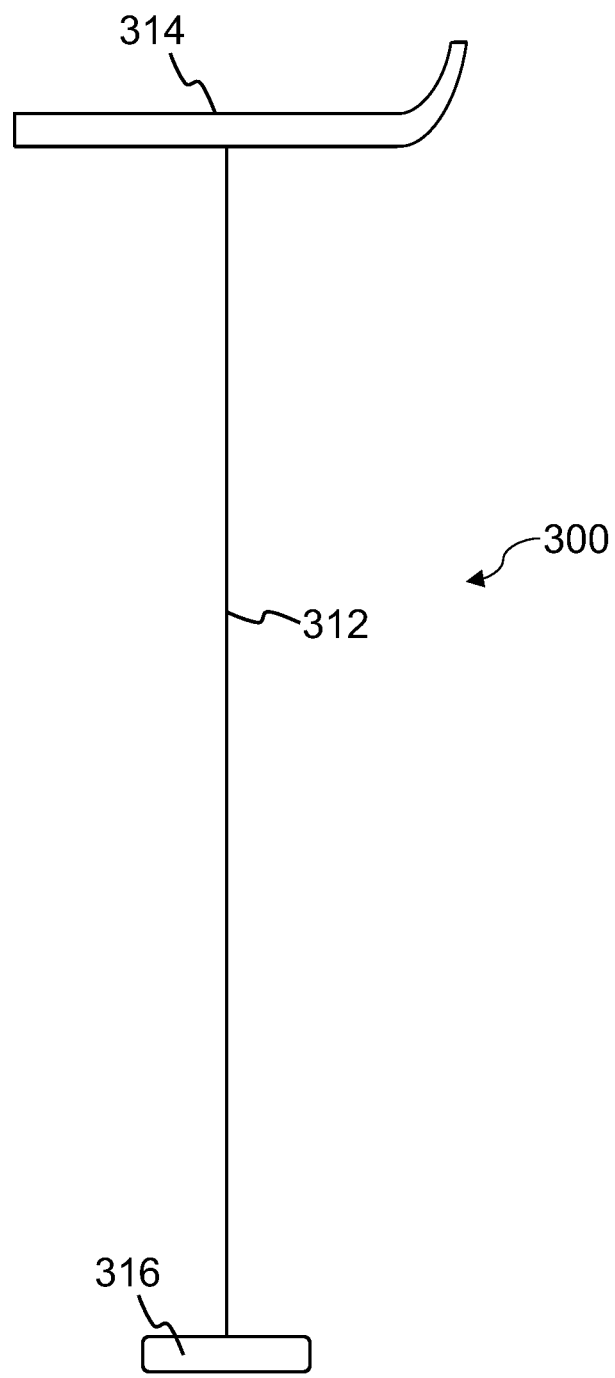
FIG. 9 is a top view of an illustrative embodiment of an anchor assembly with a radiopaque wire.
Figure 10A:
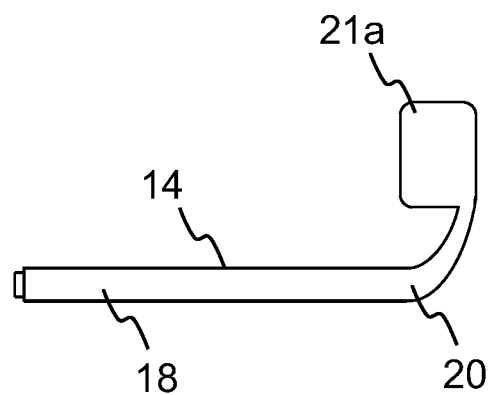
FIG. 10A is a top view of another illustrative embodiment of an anchoring component with a fiducial marker.
Figure 10B:
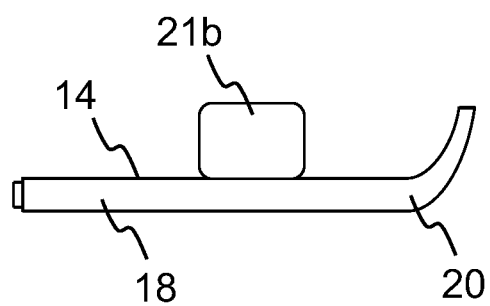
FIG. 10B is a top view of still another illustrative embodiment of an anchoring component with a fiducial marker.

FIG. 9 is a top view of an illustrative embodiment of an anchor assembly with a radiopaque wire. Another embodiment of an anchor assembly is shown in FIG. 9. Anchor assembly 300 includes first anchoring component 314, second anchoring component 316, and connector 312. In this embodiment, connector 312 is a wire made from or coated with suitable radiopaque material such as gold.

Application of the anchor assembly to the prostate can also impart information on prostate health. For example, the system can be configured to supply data on tissue stiffness or other characteristics during implantation of the anchor assembly. Such data could be used to distinguish normal, healthy tissue from abnormal tissue. After implantation, movement or other behavior of the markers over time may provide further information on prostate health, including, but not limited to, changes in size.

Fiducial markers can also be delivered to the prostate by the anchor assembly delivery device independent of the anchor assembly. Various embodiments of an anchor delivery system are detailed or contemplated in U.S. Pat. No. 9,504,461 entitled "Anchor Delivery System" which is hereby incorporated by reference in its entirety. The delivery device includes various subassemblies configured to deploy one or more anchor assemblies and/or deliver therapeutic or diagnostic agents to an interventional site within the body of a patient. In one aspect, the delivery device can include a cartridge carrying the anchor assembly or therapeutic/diagnostic agent and a handle assembly configured to couple with the cartridge such that mechanical energy loaded in at least one spring mechanism within the handle is transferred to the cartridge to deploy the anchor assembly or agent. The device includes an actuator configured to initiate transfer of the mechanical energy to the spring mechanisms.

The delivery device can also include an elongate member connected to a handle assembly that can be inserted into the urethra of a patient and advanced to establish contact with the prostate gland. The elongate member can house components to construct an anchor assembly. The elongate member can also house tools controllable by an actuator and advanceable from the elongate member such as a needle or other penetrating member that deploy one or more anchor assemblies and/or deliver therapeutic or diagnostic agents to the prostate.

It is contemplated that the hollow needle or penetrating member can be used to deliver radiopaque dye or contrast agent to the extra-prostatic space or to inject dye or agent into the prostatic lobes or urethral tissue for radiotherapy or imaging. Alternatively, the needle exit point can include tape or other adhesives configured to deposit radiopaque material onto the needle, anchor assembly, implant, or other penetrating members when the tape is pierced or otherwise contacted.

The delivery device can also be used to deliver and deposit radiopaque or therapeutic seeds, coils, or anchors into the tissue of the prostate, urethra or bladder. In some embodiments, the delivery device includes a fiducial cartridge, separate from the anchor assembly-delivering cartridge that delivers the fiducial marker as part of the actuator deployment sequence.

The delivery device can also be used to modify an existing or previously implanted anchor assembly by affixing radiopaque seeds or other radiopaque material to the anchoring components and/or connector.

In each of the detailed and contemplated embodiments, the fiducial markers can be used to delineate the prostate for, at least, the planning and execution of radiation therapy to treat prostate cancer or other cancers. The number and placement of fiducial markers can be optimized to allow triangulation and measurement of anatomical position in different planes. For procedures in which multiple anchor assemblies are used to manipulate each of the lateral prostatic lobes, fiducial markers need not be incorporated into every anchor assembly. Fiducial markers can be used to identify tissue planes or other tissue features within an organ, gland, or other collection of tissue.

In a typical procedure, the physician places implants in the anterior portion of the prostate. The physician does not place implants in the posterior aspect of the prostate because implants positioned in the posterior aspect could compress the neurovascular bundles, which are located at nearby. Similarly, placing implants in the posterior aspect of the prostate could result in damage to the rectum. However, for use as a fiducial marker, implants can be deployed in the posterior aspect of the prostate. In such an embodiment, only the distal section of the anchor assembly would be implanted. With only the distal section implanted, there would be no compression on the neurovascular bundles because the proximal anchor would not be placed, and it is this anchor that typically facilitates holding compression on tissue. Thus, it is possible to delineate the outer capsule of the prostate gland in the posterior aspect, which is often where cancerous tissue is located.

An exemplary embodiment of the invention disclosed herein is a system for delivering and depositing a fiducial marker to tissue at an interventional site within the body of a human patient, where the system includes: a first fiducial marker made of radiopaque material; at least two anchor assemblies, the anchor assemblies including a first anchoring component, a second anchoring component, and a connector; and a fiducial delivery device, the fiducial delivery device carrying the anchor assembly and comprising an actuator usable to deploy the anchor assembly and an elongate member to be inserted and advanced to the interventional site.

The exemplary embodiment includes an aspect wherein the fiducial marker is attached to a portion of each anchor assembly by swaging, molding, plating, or embedding during formation of the anchor assembly.

The exemplary embodiment includes an aspect wherein the first fiducial marker is attached to the first anchoring component.

The exemplary embodiment includes an aspect wherein the system includes a second fiducial marker and a third fiducial marker wherein the second and third fiducial markers are made of radiopaque material and attached to the first anchoring component.

The exemplary embodiment includes an aspect wherein the first fiducial marker is attached to the connector and wherein the second and third fiducial markers are made of radiopaque material and attached to the connector.

The exemplary embodiment includes an aspect wherein the first fiducial marker is attached to the second anchoring component and wherein the second and third fiducial markers are made of radiopaque material and attached to the second anchoring component.

The exemplary embodiment includes an aspect wherein the radiopaque material of the first fiducial marker is a dye or contrast agent. The exemplary embodiment includes an aspect wherein the dye or contrast agent coats the length of the connector. The exemplary embodiment includes an aspect wherein the first anchoring component and/or the second anchoring component further comprises a reservoir to hold the dye or contrast agent.

The exemplary embodiment includes an aspect wherein the first fiducial marker is made of metal. The exemplary embodiment includes an aspect wherein the first fiducial marker is made of gold, platinum, or tantalum. The exemplary embodiment includes an aspect wherein the first fiducial marker is a band or a seed.

The exemplary embodiment includes an aspect wherein first anchoring component, the second anchoring component, the connector, or a portion thereof is made of radiopaque material and serves as the first fiducial marker.

The exemplary embodiment includes an aspect wherein first anchoring component, the second anchoring component, the connector, or a portion includes features that increase radiopacity.

The exemplary embodiment includes an aspect wherein the first fiducial marker is a tag made of radiopaque material situated between the second anchoring component and the connector.

The exemplary embodiment includes an aspect wherein the system includes a plurality of fiducial markers wherein the plurality of fiducial markers are made of metal. The exemplary embodiment includes an aspect wherein the plurality of fiducial markers are made of gold, platinum, or tantalum.

The exemplary embodiment includes an aspect wherein the first anchoring component comprises a leg made of radiopaque material that serves as the first fiducial marker.

The exemplary embodiment includes an aspect wherein the connector includes a rounded tip that extends into the extra-prostatic space when the anchor assembly is implanted into a prostatic lobe of a patient, wherein the rounded tip includes radiopaque material and serves as the first fiducial marker.

The exemplary embodiment includes an aspect wherein the fiducial delivery device further comprises a needle advanceable from the elongate member.

The exemplary embodiment includes an aspect wherein the fiducial marker is manipulated after being delivered.

The exemplary embodiment includes an aspect wherein the fiducial marker is placed in intra-prostatic space, extra-prostatic space, on the prostatic capsule, or combinations thereof.

The exemplary embodiment includes an aspect wherein the fiducial marker is biodegradable.

The exemplary embodiment includes an aspect wherein the fiducial marker delivers therapy to tissue.

The exemplary embodiment includes an aspect wherein the needle is configured to deliver the first fiducial marker. The exemplary embodiment includes an aspect wherein the system includes a second fiducial marker and a third fiducial marker wherein the second and third fiducial markers are delivered to the interventional site by the needle. The exemplary embodiment includes an aspect wherein the first fiducial marker is a dye or contrast agent delivered by the needle. The exemplary embodiment includes an aspect wherein the needle injects the dye or contrast agent into tissue adjacent to the prostate. The exemplary embodiment includes an aspect wherein the needle injects the dye or contrast agent into the prostatic lobes. The exemplary embodiment includes an aspect wherein the needle injects the dye or contrast agent into the extra-prostatic space.

The exemplary embodiment includes an aspect wherein at least two of the first, second, or third fiducial marker span a gland or organ. The exemplary embodiment includes an aspect wherein the fiducial marker is placed at a tissue plane.

The exemplary embodiment includes an aspect wherein the system delivers fiducial markers to the prostate for the purpose of delineating the prostate during radiotherapy.

While particular elements, embodiments and applications of the present invention have been shown and described, it will be understood that the invention is not limited thereto since modifications can be made by those skilled in the art without departing from the scope of the present disclosure, particularly in light of the foregoing teachings.

We claim:

1. A system for delivering and depositing at least one fiducial marker to tissue at an interventional site within a body of a human patient, comprising:
    an anchor assembly deployable at the interventional site, the anchor assembly comprising a first anchoring component, a second anchoring component, a connector, and the at least one fiducial marker, wherein:
        the at least one fiducial marker comprises a sheet of a radiopaque material that forms an interference fit between at least one of the first anchoring component or the second anchoring component and the connector; and
    a fiducial delivery device carrying the anchor assembly, the fiducial delivery device comprising:
        an elongate member to be inserted into the body of the human patient and advanced to the interventional site; and
        an actuator usable to deploy the anchor assembly at the interventional site.

2. The system of claim 1, further comprising a second anchor assembly, the second anchor assembly including a third anchoring component and a fourth anchoring component, and at least one second fiducial marker made of the radiopaque material attached to at least one of the third anchoring component or the fourth anchoring component.

3. The system of claim 2, wherein the second anchor assembly includes three fiducial markers attached to at least one of the third anchoring component or the fourth anchoring component.

4. The system of claim 1, wherein the at least one fiducial marker is attached to the connector by sandwiching the sheet between the connector and one of the first anchoring component or the second anchoring component.

5. The system of claim 4, further comprising a second anchor assembly, the second anchor assembly including a connector with three fiducial markers attached to the connector.

6. The system of claim 1, wherein the at least one fiducial marker is attached to one of the first anchoring component or the second anchoring component by sandwiching the sheet between the connector and one of the first anchoring component or the second anchoring component.

7. The system of claim 6, further comprising a second anchor assembly, the second anchor assembly including a third anchoring component, a fourth anchoring component, and at least one second fiducial marker, wherein the at least one second fiducial marker comprises three fiducial markers attached to at least one of the third anchoring component or the fourth anchoring component.

8. The system of claim 1, further comprising a second anchor assembly, the second anchor assembly including a third anchoring component and a fourth anchoring component, and at least one second fiducial marker wherein a radiopaque material of the at least one second fiducial marker is a dye or a contrast agent.

9. The system of claim 8, further comprising a second connector disposed between the third anchoring component and the fourth anchoring component, wherein the dye or the contrast agent coats a length of the second connector.

10. The system of claim 9, wherein the third anchoring component and/or the fourth anchoring component further comprises a reservoir to hold the dye or the contrast agent.

11. The system of claim 1, further comprising a second anchor assembly, the second anchor assembly including a third anchoring component, a fourth anchoring component, a second connector, and at least one second fiducial marker wherein the second connector includes a rounded tip configured to extend into an extra-prostatic space when the second anchor assembly is implanted into a prostatic lobe of the human patient, wherein the rounded tip includes radiopaque material and serves as the at least one second fiducial marker.

12. The system of claim 1, wherein the fiducial delivery device further comprises a needle advanceable from the elongate member.

13. The system of claim 12, wherein the needle is configured to deliver the at least one fiducial marker.

14. The system of claim 12, further comprising at least one second fiducial marker, wherein the at least one second fiducial marker comprises a dye or contrast agent delivered by the needle.

15. The system of claim 1, wherein the at least one fiducial marker is configured to be placed in intra-prostatic space, extra-prostatic space, on a prostatic capsule, or combinations thereof.

16. The system of claim 1, further comprising a second anchor assembly, the second anchor assembly including at least one second fiducial marker, wherein the at least one second fiducial marker is biodegradable.

17. The system of claim 1, further comprising a second anchor assembly, the second anchor assembly including at least one second fiducial marker, wherein the at least one second fiducial marker delivers therapy to tissue.

18. The system of claim 1, further comprising a second anchor assembly, the second anchor assembly including at least one second fiducial marker configured to be delivered to span a gland or organ.

19. The system of claim 1, further comprising a second anchor assembly, the second anchor assembly including at least one second fiducial marker, wherein the at least one second fiducial marker is configured to be placed at a tissue plane.

* * * * *